United States Patent
Waters et al.

(10) Patent No.: US 7,007,765 B2
(45) Date of Patent: Mar. 7, 2006

(54) METHOD FOR DRIVING A WHEELED CARRIAGE

(75) Inventors: Keith Waters, Plainwell, MI (US); Dennis Reed, Portage, MI (US); Mark Friedman, Portage, MI (US); Craig Mulder, Dorr, MI (US); Steve Nichols, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 10/833,552

(22) Filed: Apr. 28, 2004

(65) Prior Publication Data

US 2004/0200646 A1   Oct. 14, 2004

Related U.S. Application Data

(62) Division of application No. 09/489,584, filed on Jan. 21, 2000, now Pat. No. 6,772,850.

(51) Int. Cl.
*B60K 1/00* (2006.01)
(52) U.S. Cl. .................. 180/19.3; 180/15; 180/65.5
(58) Field of Classification Search ...... 180/65.1–65.6, 180/15, 16, 19.1, 19.3; 5/600
See application file for complete search history.

(56) References Cited

U.S. PATENT DOCUMENTS

| | | |
|---|---|---|
| 3,112,001 A | 11/1963 | Wise |
| 3,286,602 A | 11/1966 | Butner et al. |
| 3,304,116 A | 2/1967 | Stryker |
| 3,380,546 A | 4/1968 | Rabjohn |
| 3,404,746 A | 10/1968 | Slay |
| 3,452,371 A | 7/1969 | Hirsch |
| 3,580,351 A | 5/1971 | Mollen |
| 3,802,524 A | 4/1974 | Seidel |
| 3,807,585 A | 4/1974 | Holzmann |
| 3,869,011 A | 3/1975 | Jensen |
| 3,938,608 A | 2/1976 | Folco-Zambelli |
| 4,102,424 A | 7/1978 | Heinze |
| 4,221,273 A | 9/1980 | Finden |
| 4,260,035 A | 4/1981 | Loveless et al. |
| 4,284,929 A | 8/1981 | Garrett et al. |
| 4,407,393 A | 10/1983 | Youdin et al. |
| 4,475,613 A | 10/1984 | Walker |
| 4,614,246 A | 9/1986 | Masse et al. |
| 4,646,860 A | 3/1987 | Owens et al. |
| 4,768,241 A | 9/1988 | Beney |
| 4,848,504 A | 7/1989 | Olson |
| 4,874,055 A | 10/1989 | Beer |

(Continued)

FOREIGN PATENT DOCUMENTS

CA   2 010 543   9/1990

(Continued)

*Primary Examiner*—Lesley D. Morris
*Assistant Examiner*—Matthew Luby
(74) *Attorney, Agent, or Firm*—Flynn, Thiel, Boutell & Tanis, P.C.

(57) ABSTRACT

A powered wheeled carriage includes a patient support and a wheeled base. An auxiliary wheel mechanism includes an auxiliary wheel spring support for biasing an auxiliary wheel into contact with a floor. Operating a control apparatus moves the auxiliary wheel away from the floor. A drive handle pivots about a single axis to control a drive motor that powers the auxiliary wheel. The drive handle controls driving of the wheeled carriage in forward and rearward directions. A decision/drive circuit ramps the speed of the wheeled carriage for a few second after start-up to prevent a jerking motion. A display/control panel displays the condition of the carriage brake and the condition of the auxiliary wheel to assist an operator.

17 Claims, 16 Drawing Sheets

U.S. PATENT DOCUMENTS

| | | |
|---|---|---|
| 4,953,243 A | 9/1990 | Birkmann |
| 5,064,012 A | 11/1991 | Losego |
| 5,083,625 A | 1/1992 | Bleicher |
| 5,113,959 A | 5/1992 | Mastov et al. |
| 5,121,806 A | 6/1992 | Johnson |
| 5,156,226 A | 10/1992 | Boyer et al. |
| 5,193,633 A | 3/1993 | Ezenwa |
| 5,222,567 A | 6/1993 | Broadhead et al. |
| 5,234,066 A | 8/1993 | Ahsing et al. |
| 5,337,845 A | 8/1994 | Foster et al. |
| 5,390,382 A | 2/1995 | Hannant et al. |
| 5,542,690 A | 8/1996 | Kozicki |
| 5,778,996 A | 7/1998 | Prior et al. |
| 5,806,111 A | 9/1998 | Heimbrock et al. |
| 5,810,104 A | 9/1998 | Campbell |
| 5,826,670 A | 10/1998 | Nan |
| 5,927,414 A | 7/1999 | Kan et al. |
| 5,937,959 A | 8/1999 | Fujii et al. |
| 5,937,961 A | 8/1999 | Davidson |
| 5,944,131 A | 8/1999 | Schaffner et al. |
| 5,964,313 A | 10/1999 | Guy |
| 5,983,425 A | 11/1999 | DiMucci et al. |
| 6,000,076 A | 12/1999 | Webster et al. |
| 6,000,486 A | 12/1999 | Romick et al. |
| 6,050,356 A | 4/2000 | Takeda et al. |
| 6,070,679 A | 6/2000 | Berg et al. |
| 6,098,732 A | 8/2000 | Romick et al. |
| 6,154,690 A | 11/2000 | Coleman |
| 6,178,575 B1 | 1/2001 | Harada |
| 6,209,670 B1 | 4/2001 | Fernie et al. |
| 6,256,812 B1 | 7/2001 | Bartow |
| 6,286,165 B1 | 9/2001 | Heimbrock et al. |
| 6,330,926 B1 | 12/2001 | Heimbrock et al. |
| 6,367,817 B1 | 4/2002 | Kamen et al. |
| 6,390,213 B1 | 5/2002 | Bleicher |
| 6,588,523 B1 | 7/2003 | Heimbrock et al. |
| 6,749,034 B1 * | 6/2004 | Vogel et al. ............... 180/19.1 |
| 6,752,224 B1 | 6/2004 | Hopper et al. |
| 6,877,572 B1 * | 4/2005 | Vogel et al. .................. 180/15 |
| 2003/0084508 A1 * | 5/2003 | Faucher et al. ............ 5/81.1 R |
| 2003/0097712 A1 * | 5/2003 | Gallant et al. ................. 5/510 |
| 2003/0102172 A1 * | 6/2003 | Kummer et al. ........... 180/19.1 |
| 2003/0159861 A1 | 8/2003 | Hopper et al. |
| 2004/0163175 A1 * | 8/2004 | Vogel et al. ................... 5/600 |
| 2005/0065675 A1 * | 3/2005 | Georgi et al. ................. 701/23 |

FOREIGN PATENT DOCUMENTS

| | | |
|---|---|---|
| DE | 43 19 516 A1 | 12/1994 |
| EP | 0 062 180 A2 | 10/1982 |
| EP | 0 093 700 | 11/1983 |
| EP | 0 329 504 B1 | 8/1989 |
| EP | 0 352 647 B1 | 1/1990 |
| EP | 0 403 202 B1 | 12/1990 |
| EP | 0 630 637 | 12/1994 |
| EP | 0 653 341 A1 | 5/1995 |
| JP | 10-181609 | 7/1998 |
| JP | 10-305705 | 11/1998 |
| JP | 2000-118407 | 4/2000 |
| WO | WO 87/07830 | 12/1987 |
| WO | WO 94/21505 | 9/1994 |
| WO | WO 95/20514 | 8/1995 |
| WO | WO 96/07555 | 3/1996 |
| WO | WO 96/33900 | 10/1996 |

* cited by examiner

50 %

75 %

25 %

METHOD FOR DRIVING A WHEELED CARRIAGE

This application is a division of Ser. No. 09/489 584 filed Jan. 21, 2000, now U.S. Pat. No. 6,772,850.

FIELD OF THE INVENTION

This invention relates to a wheeled carriage for supporting a patient in a substantially horizontal position, and more particularly, to a wheeled carriage having pedal control for deployment of an auxiliary wheel and a drive member for motorized control of the auxiliary wheel to drive the wheeled carriage in forward and reverse directions. Decision/drive and auxiliary wheel power drive circuits enable controlled and safe operation of the auxiliary wheel of the wheeled carriage.

BACKGROUND OF THE INVENTION

Wheeled carriages for supporting a patient in a substantially horizontal position are well known in the art and a representative example of an early version of such a device is illustrated in Dr. Homer H. Stryker's U.S. Pat. No. 3,304,116 reference to which is incorporated herein. Dr. Stryker's innovative wheeled carriage included a fifth wheel which is raisable and lowerable by an attendant directly manually manipulating the wheel support frame oriented beneath the patient supporting portion of the wheeled carriage. The fifth wheel is positioned at substantially the center of the undercarriage such that usually the rear castered wheels and the fifth wheel support the carriage when the fifth wheel is deployed. However, the front castered wheels and the fifth wheel may also support a patient on the wheeled carriage depending on the position of the patient. Therefore, the wheeled carriage of U.S. Pat. No. 3,304,116 can teeter between the front wheels and the rear wheels when a patient is being moved thereon with the fifth wheel deployed.

An example of a maneuverable hospital cart having a power source and a retractable drive wheel located toward the center of the cart is set forth in U.S. Pat. No. 5,083,625 to Bleicher. The cart of Bleicher includes a joystick for operating a power system to move the cart in a selected direction. The support for the fifth wheel is rotatable, thus enabling the joystick to select any direction, including sideways, for movement of the cart.

U.S. Pat. No. 5,337,845 to Foster et al discloses a care cart capable of docking with a hospital bed and including a joystick type potentiometer for controlling the speed and direction of the bed when the cart is docked thereto. The handle includes a button that enables the driving wheel to activate when selected. The joystick is connected to a pulse modulation controller circuit which is in turn connected to a motor/gear box for driving the cart. Gas springs are actuated by the bed when the motorized transport apparatus and bed are docked together to exert a downward force on the drive wheel to reduce slipping thereof during use. An electronic fuel gauge monitors the battery life of DC batteries located on board the cart. A DC battery charger on board the cart recharges the batteries when the cart is plugged into an AC wall outlet.

U.S. Pat. No. 6,256,812 to Bartow issued Jul. 10, 2001 discloses a wheeled carriage having an auxiliary wheel. The carriage includes a control pedal and a shaft. The shaft connects to a cam arrangement for moving the auxiliary wheel between first and second predetermined positions and a neutral position.

Accordingly, it is an object of this invention to provide an improved auxiliary wheel that prevents teetering of the wheeled carriage when the floor is not level. Such a result can be obtained by an auxiliary wheel spring support secured to one of the end frame members and extending at a substantially horizontal angle and biasing the auxiliary wheel downwardly to prevent teetering when the floor under the center of the wheeled carriage is higher relative to the floor at the respective ends of the wheeled carriage.

Another preferred object of the invention is to provide an improved drive handle that operates an auxiliary drive wheel to move the wheeled carriage in opposing directions corresponding to forward and rearward directions with respect to the length of the wheeled carriage. The drive handle, an auxiliary wheel drive power circuit and an electrical decision/drive circuit can operate to provide simple control requiring little strength by an operator for moving the wheeled carriage.

Another preferred object of the invention is to enable the drive handle to be used for power control during driving of the wheeled carriage when the auxiliary wheel is lowered and to be used for manual moving of the wheeled carriage when the auxiliary wheel is in a retracted position.

Another preferred object of the invention is to motion safety sensors for disabling driving of the auxiliary wheel unless one of the motion safety sensors is grasped by an operator.

Another preferred object of the invention is to provide improved operation of the power assisted wheeled carriage by using the auxiliary wheel power drive circuit to charge batteries of the wheeled carriage when the power drive circuit is connected to a standard AC electrical outlet and to provide battery power when AC power is not available.

Another preferred object of the invention is a decision/drive circuit that authorizes driving of the auxiliary wheel only when certain conditions, such as the brake being released and the auxiliary wheel being in lowered position are present. The decision/drive circuit ensures smooth driving of the auxiliary wheel when the carriage begins moving, thereby avoiding a jerking motion.

Another preferred embodiment of the invention is a timeout subroutine for preventing driving of the auxiliary wheel when the motion safety sensors are tampered with and for disabling the AC invertor to conserve power when the wheeled carriage has not been driven for a predetermined period of time.

SUMMARY OF THE INVENTION

The objects and purposes of this invention have been met by a wheeled carriage including a wheeled base supporting a patient support and enabling movement of the patient support. An auxiliary wheel mechanism secured to the wheeled base includes an auxiliary wheel spring support and an auxiliary wheel biased into a first engaged position in contact with the floor. A control apparatus effects movement of the auxiliary wheel spring support and the auxiliary wheel to a second position where the auxiliary wheel is out of engagement with the floor. The control apparatus does not contact the auxiliary wheel spring support when the auxiliary wheel is in the first position. An auxiliary wheel drive power circuit drives the auxiliary wheel. A decision/drive circuit controls the auxiliary wheel drive power circuit to provide the direction and drive speed for the auxiliary wheel. A pivotable drive handle at an end of the wheeled carriage, pivotable about a single axis, pivots in a first direction about the single axis enabling the decision/drive circuit to authorize the auxiliary wheel power drive circuit to drive the auxiliary wheel in a first direction. When the drive handle pivots in a second opposing direction about the axis, the decision/drive circuit authorizes the power drive circuit to drive the auxiliary wheel, and thus the wheeled carriage, in a second opposing direction.

The decision/drive circuit varies the voltage output to the motor controller to prevent jerking or rough operation when the auxiliary wheel starts driving the carriage. This is done by controlling pulse width modulation signals sent to the motor controller from the CPU of the decision/drive circuit when the auxiliary wheel begins driving the wheeled carriage. This control includes an equation providing a ramping effect to the speed of the auxiliary wheel for a predetermined time after start-up of the auxiliary wheel drive motor.

The auxiliary wheel power drive circuit enables charging of batteries and provides power to the AC circuit board and the drive motor when appropriate.

The decision/drive circuit indicates the set or released condition of the carriage brake, the raised or lowered position of the auxiliary wheel and the need to change the batteries of the wheeled carriage by energizing indicators on the display/control panel 80. The decision/drive circuit authorizes driving of the auxiliary wheel only when the wheeled carriage is set for operation by having the brake released, by having the auxiliary wheel contacting the floor and by having the wheeled carriage unplugged from an outside power supply.

The decision/drive circuit also prevents operation of the auxiliary wheel when the motion safety sensors are in a closed position for a predetermined period of time while the wheeled carriage is not driven. This improves safety because the auxiliary motor will not operate if either of the motion safety sensors is in the closed position or if the safety switches are short circuited. Further, the decision/drive circuit disables the AC invertor to conserve power when the wheeled carriage has not been driven for a predetermined period of time.

BRIEF DESCRIPTION OF THE DRAWINGS

Other objects and purposes of the invention will be apparent to persons acquainted with an apparatus of this general type upon reading the following specification and inspecting the accompanying drawings, in which.

DETAILED DESCRIPTION OF THE INVENTION

Figure 1:
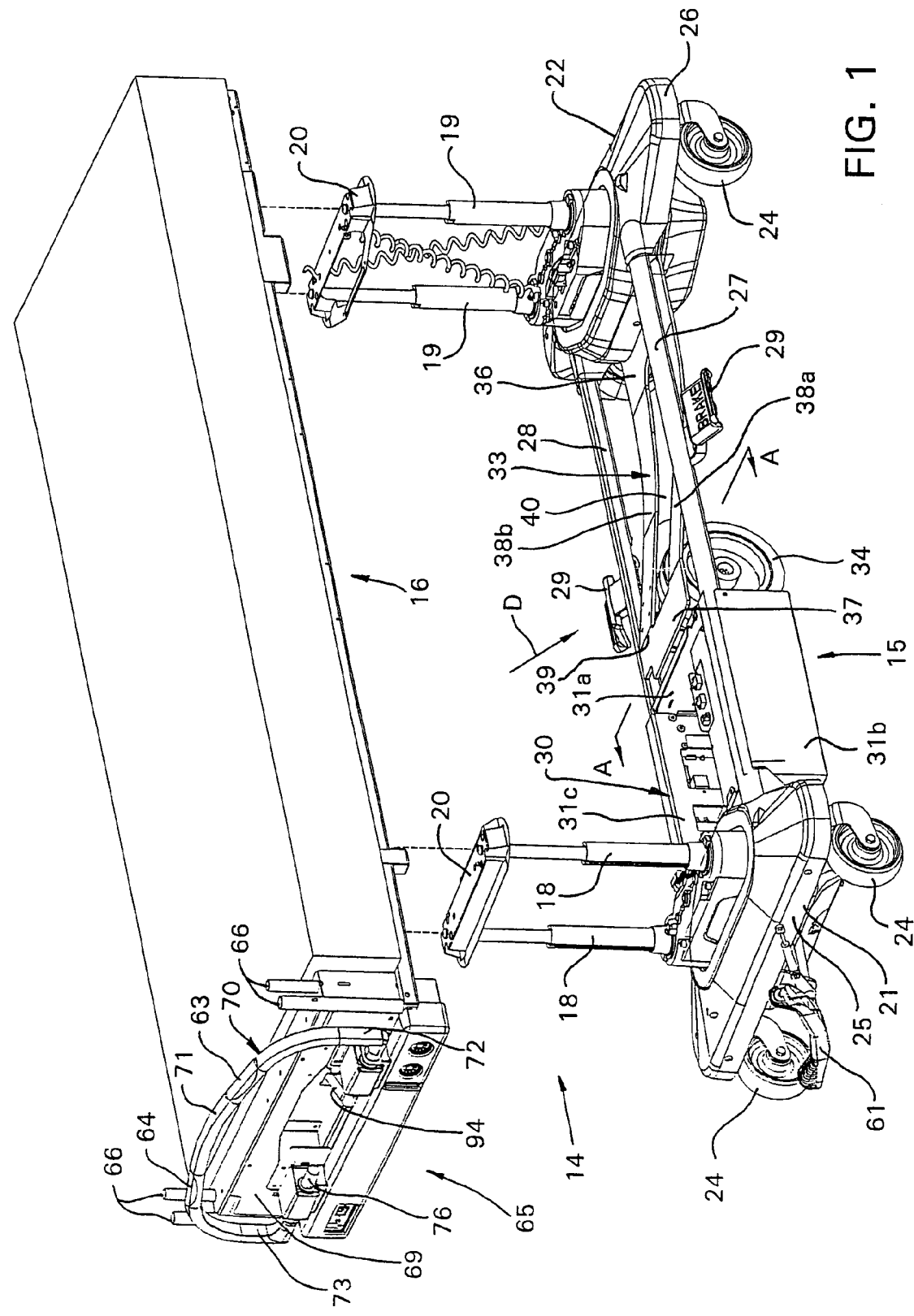
FIG. 1 is an exploded isometric view of a wheeled carriage for supporting a patient in a substantially horizontal position and embodying the invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the wheeled carriage and designated parts thereof. Such terminology will include the words specifically mentioned, derivatives thereof, and words of similar import.

Referring to the drawings and specifically FIG. 1, there is illustrated a power assisted wheeled carriage 14 for supporting a patient in a substantially horizontal position. A known wheeled carriage is disclosed in Dr. Homer H. Stryker's U.S. Pat. No. 3,304,116.

The wheeled carriage 14 includes a wheeled base 15, a patient support 16, and two sets of telescoping screw lifts 18, 19 interposed between the wheeled base 15 and the patient support 16 at opposing ends 21, 22 thereof. The screw lifts 18, 19 are secured to the patient support 16 by mounting elements 20. The telescoping screw lifts can be of a conventional type known in the prior art.

The wheeled base 15 includes four castered wheels 24 at the corners of the opposing ends 21, 22 thereof defining a theoretical polygon, in this case, a rectangle.

Figure 2:
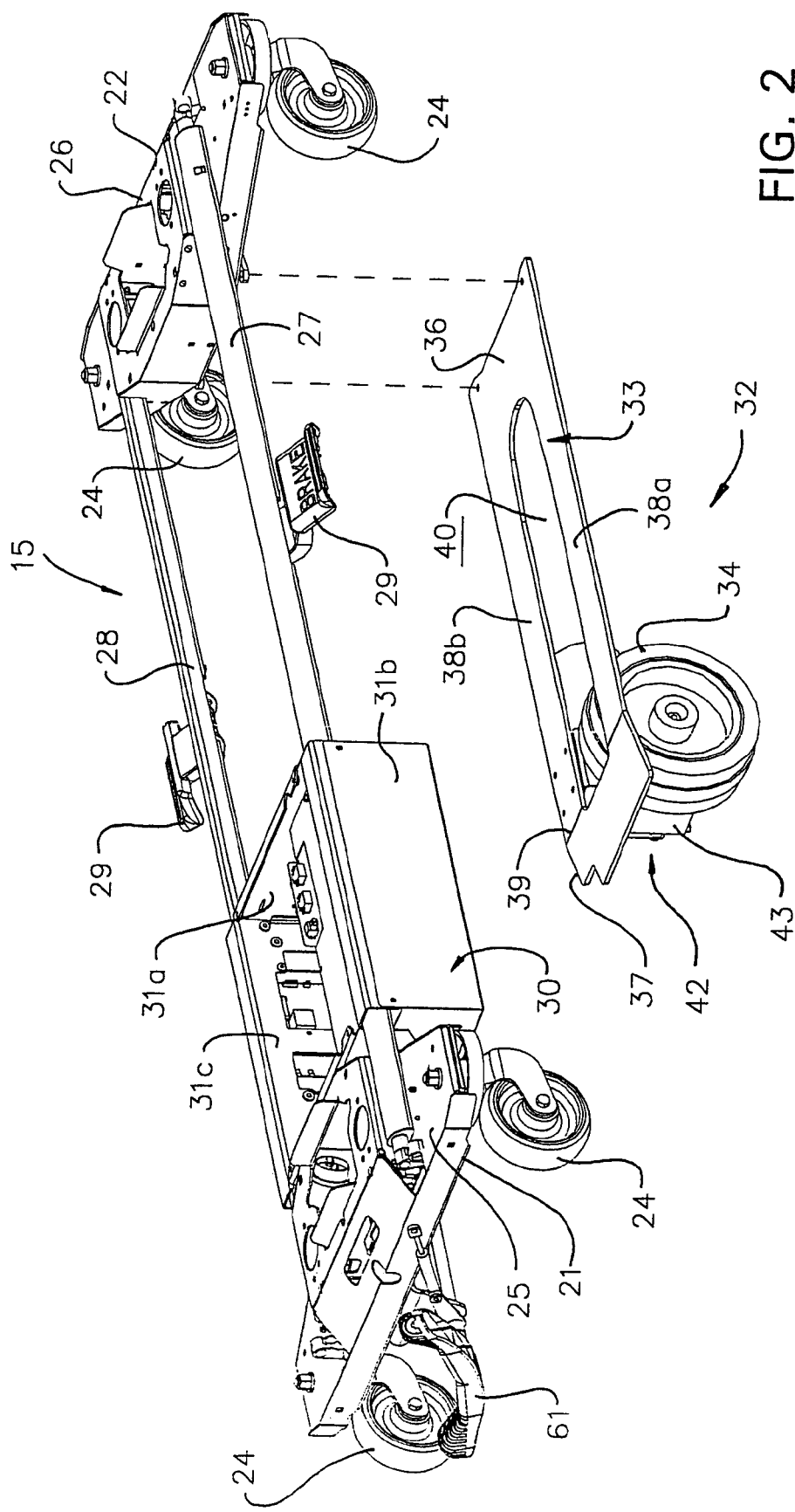
FIG. 2 is an exploded isometric view of a wheeled base and an auxiliary wheel mechanism.

The castered wheels 24 are bolted or otherwise secured to respective end frame members 25, 26 as shown in FIG. 2. The end frame members 25, 26 are secured to each other by spaced frame bars 27, 28. The frame bars 27, 28 form the length of the wheeled base 15.

Brake pedals 29 are shown secured to frame bars 27, 28 at opposing sides of the wheeled base 15. The brake pedals 29 operate in a conventional manner to set or release a carriage brake.

The wheeled base 15 also includes an electronics and power supply housing 30 for receiving and containing a power source or supply, such as a battery or batteries. The electronics and power supply housing 30 includes an end wall 31a on the backside thereof. The housing 30 is also formed by side walls 31b and 31c which can contain electronic control circuitry which will be described later.

Auxiliary Wheel Mechanism

An auxiliary wheel mechanism 32 is secured to the wheeled base 15 as shown in the exploded view of FIG. 2. The auxiliary wheel mechanism 32 includes an auxiliary wheel spring support 33 for biasing at least one auxiliary wheel 34 into engagement with a floor under the wheeled carriage 14.

The auxiliary wheel spring support 33 preferably comprises an elongate, flat, sheet-like, spring steel member with an opening therethrough defining at a first end thereof a supported base 36 secured to the end frame member 26 of the wheeled base 15 and at a second end thereof an unsupported opposing base 37 having a bend 39 at a region defining an intersection of the second base 37 and spaced apart arms 38a, 38b of the auxiliary wheel spring support 33 which extend between the bases 36 and 37. The opening 40 of the auxiliary wheel spring support 33 is elongated in the same elongate direction of the spring steel member and has a predetermined radius at the respective ends adjacent the bases 36 and 37 such that the arms 38a, 38b have predetermined widths.

Figure 7:
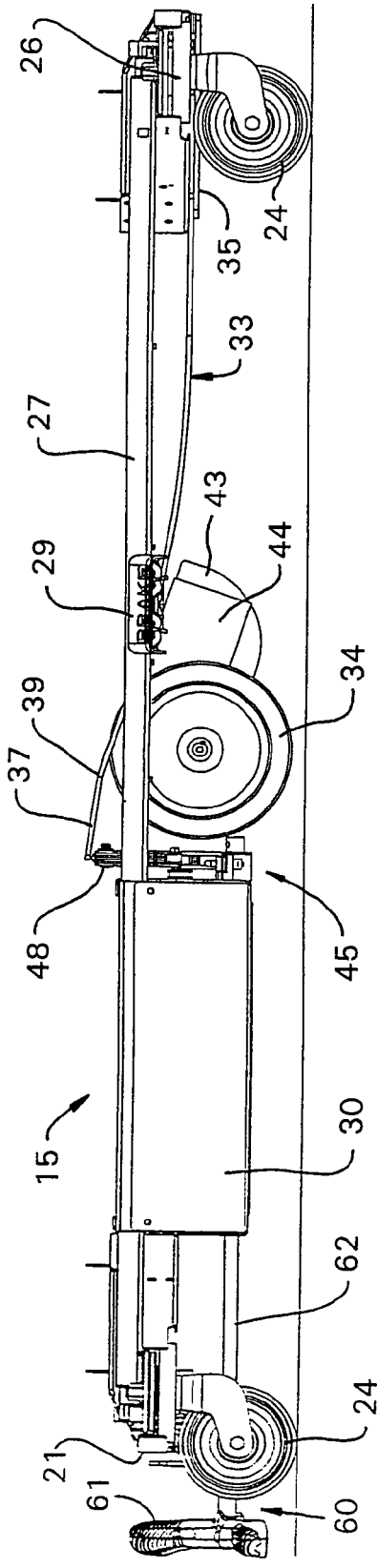
FIG. 7 is a partial side view of the wheeled base showing the cam mechanism supporting the auxiliary wheel off of the floor.
Figure 8:
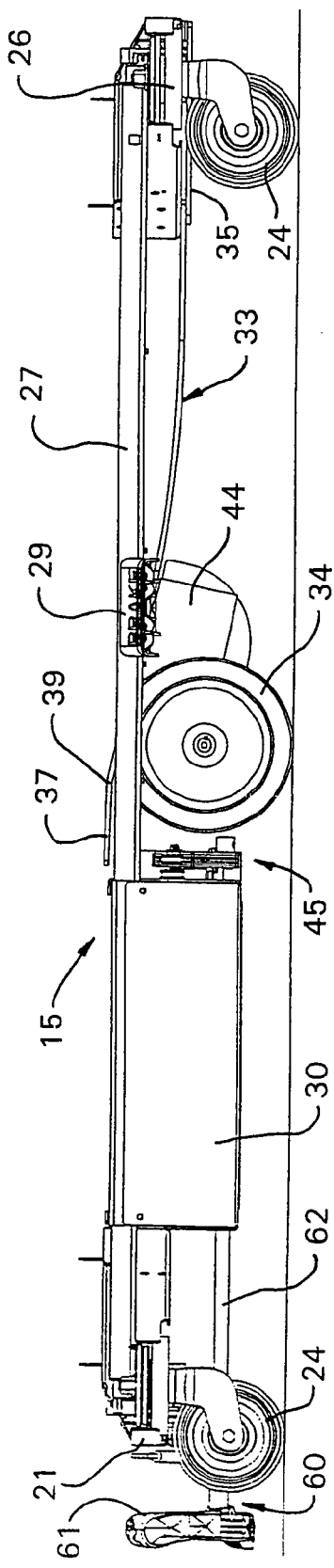
FIG. 8 is a partial side view of the wheeled base showing the auxiliary wheel released and freely contacting the floor.

The auxiliary wheel spring support 33 acts as a cantilevered leaf spring secured to the end frame member 26. As best shown in FIGS. 7 and 8, the base 36 of the auxiliary wheel spring support 33 is secured to the frame member 26 so that the auxiliary wheel spring support is substantially parallel to an imaginary plane formed by the frame bars 27, 28. However, flexing of the auxiliary wheel spring support 33 defines the view shown in FIGS. 7 and 8.

Stiffener 35, shown in FIGS. 7 and 8, supports the auxiliary wheel spring support 33 with respect to the end frame member 26. The stiffener 35 prevents the auxiliary wheel spring support 33 from bending the frame member 26 of the wheeled base 15. While a single stiffener 35 is illustrated, first and second spaced stiffeners are preferred.

Figure 3:
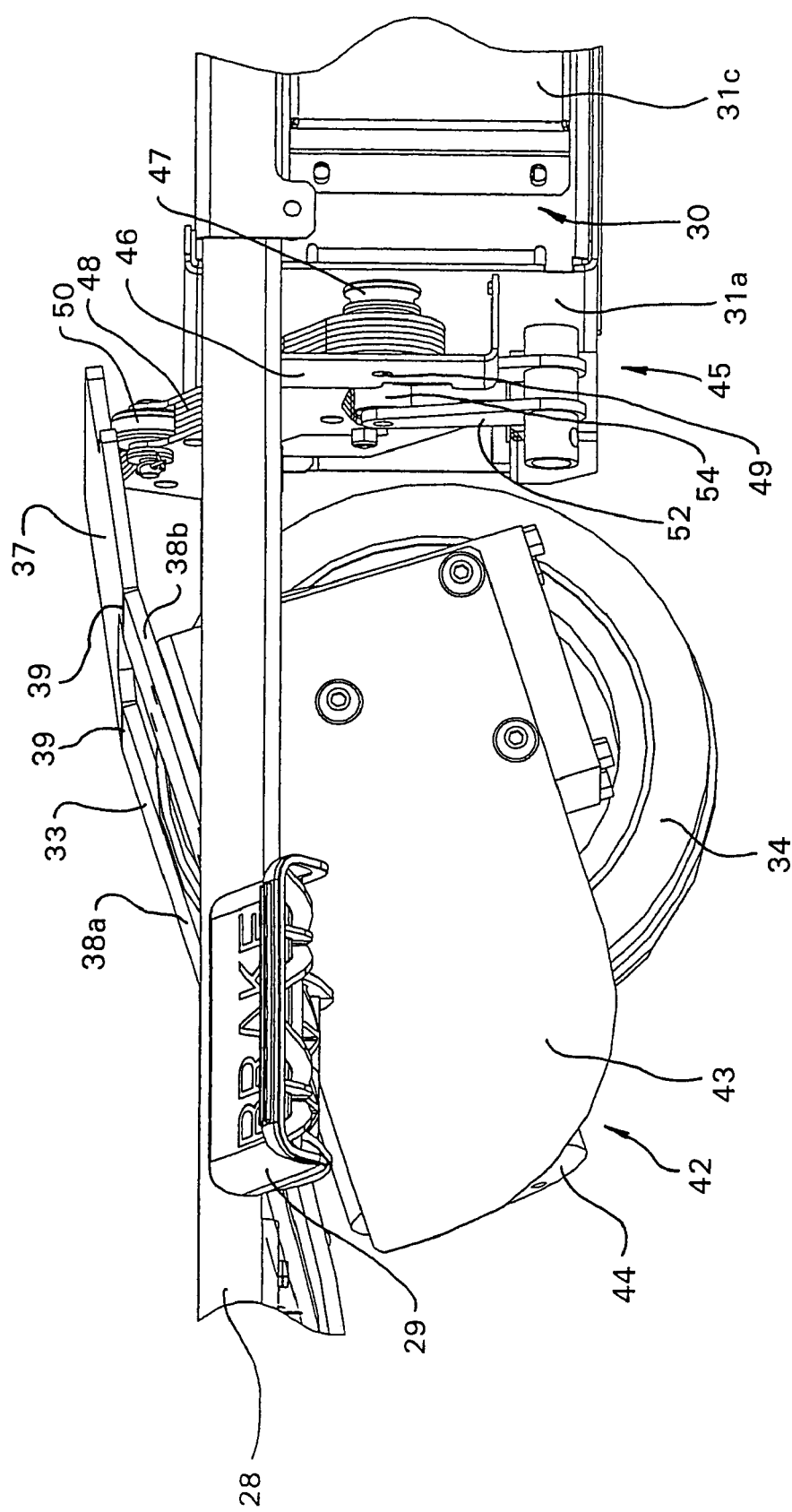
FIG. 3 is a partial isometric view showing a drive motor assembly and a cam mechanism in an auxiliary wheel retracting position as viewed from the direction D of FIG. 1.

A drive motor assembly 42, shown in FIGS. 2–3 acts as part of the auxiliary wheel mechanism 32. The drive motor assembly 42 is secured to the auxiliary wheel spring support 33 adjacent the bend 39 thereof. The drive motor assembly 42 includes a drive motor shield 43 shown in FIG. 3 protecting a drive motor 44. The drive motor preferably comprises a reversible DC drive motor allowing rotation of a drive shaft (not shown) in forward and reverse directions. The auxiliary wheel 34 is supported by the drive shaft of the drive motor assembly 42 adjacent the base 37 in the preferred embodiment. As shown in FIG. 2, the auxiliary wheel 34 is positioned below the arms 38a, 38b and in alignment with the opening 40 of the auxiliary wheel spring support 33.

Cam Apparatus

Figure 4:
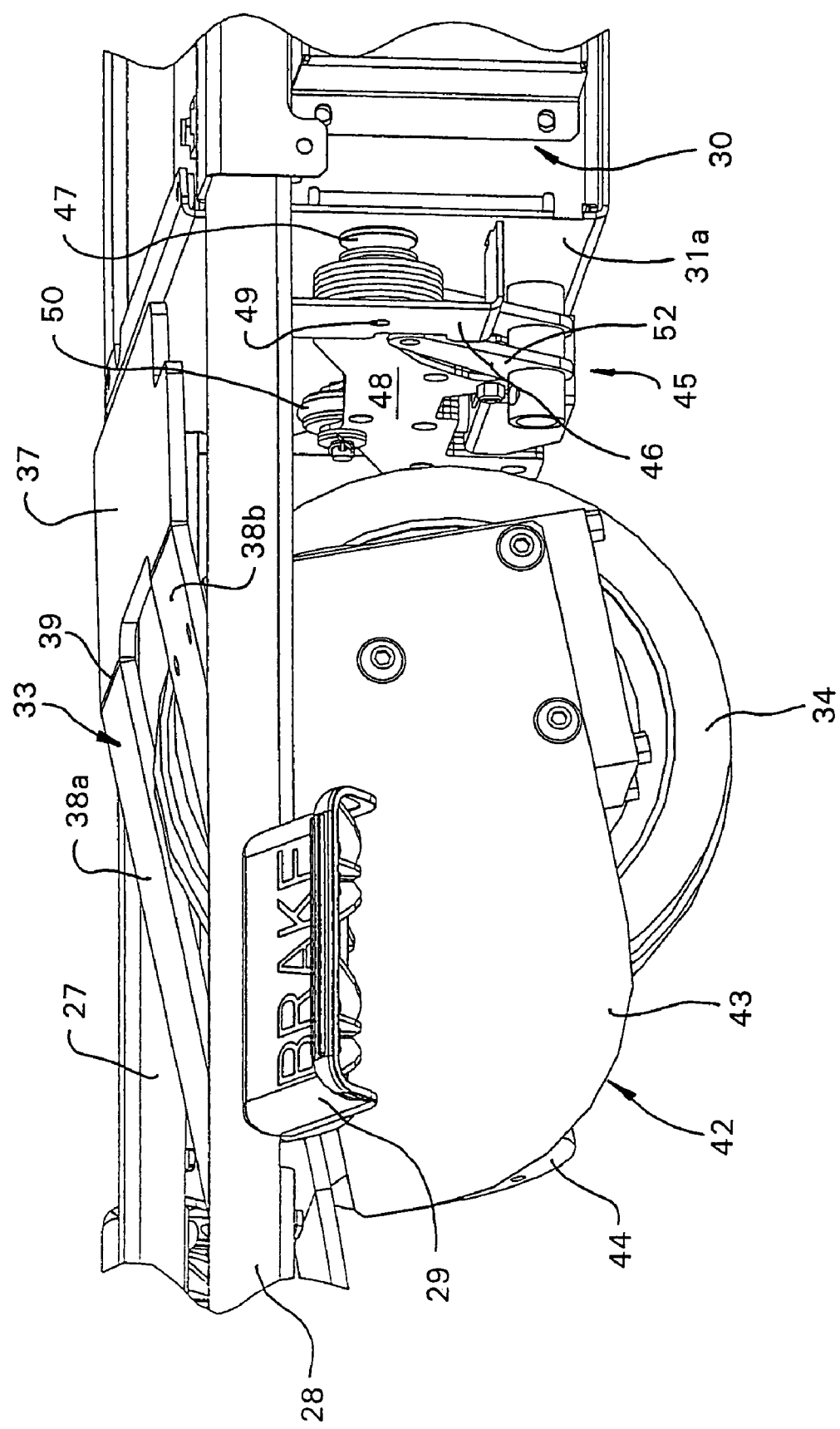
FIG. 4 is a partial isometric view showing the drive motor assembly and the cam mechanism in a released position as viewed from the direction D of FIG. 1.

A cam apparatus 45 is shown in FIGS. 3–4. The cam apparatus 45 is secured to the wheeled base 15 at the end wall 31a of the electronics and power supply housing 30. In other embodiments (not shown), the cam apparatus 45 can be secured to one or both of the frame bars 27, 28. The cam apparatus 45 includes a cam pivot bracket 46 secured to the end wall 31a of the electronics and power supply housing 30.

The cam apparatus 45 also includes a cam 48, a cam pivot spacer 47 and a cam pivot pin 49. The cam pivot pin 49 pivotably and rotatably secures the cam 48 to the cam pivot bracket 46. The cam pivot pin 49 can comprise a pin element.

Figure 5:
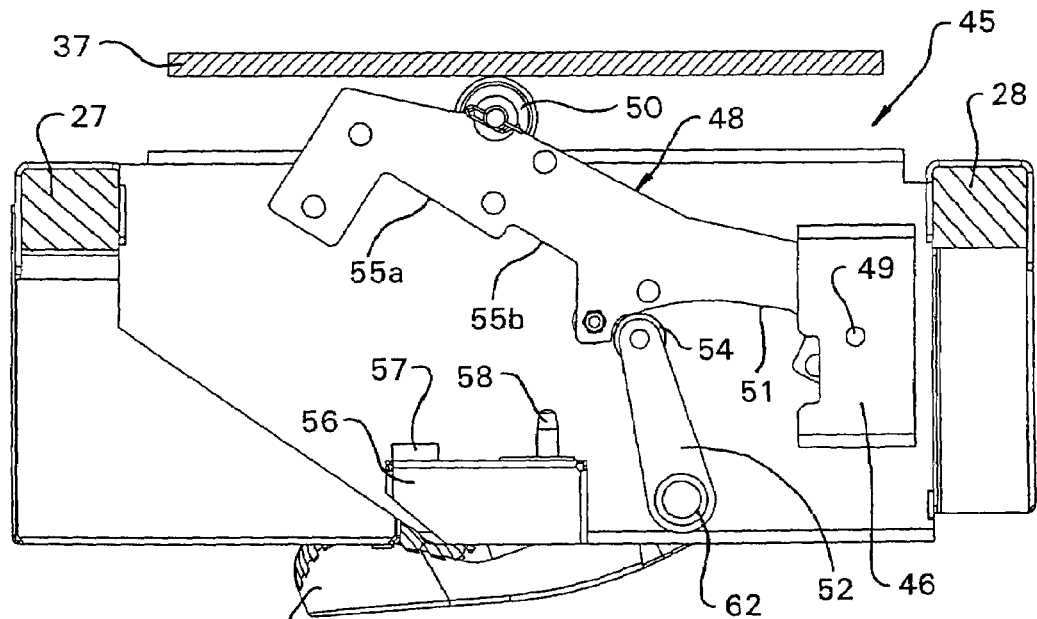
FIG. 5 is a partial sectional view taken at A—A in FIG. 1 and showing the cam mechanism acting upon the auxiliary wheel spring support.
Figure 6:
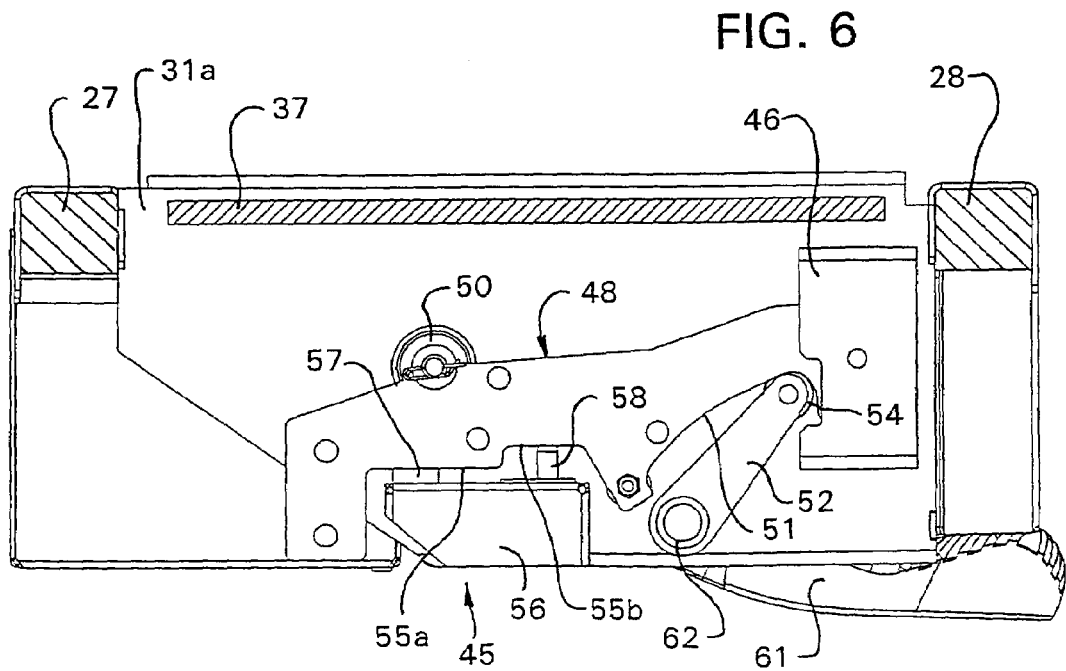
FIG. 6 is a partial sectional view taken at A—A in FIG. 1 and showing the auxiliary wheel spring support released by the cam mechanism.

The cam 48 is pivotably secured at one end thereof to the cam pivot bracket 46 by cam pivot pin 49. The cam 48 has a length extending away from the cam pivot bracket 46. A location along a top edge of the cam 48 receives and supports a cam roller 50 extending upwardly above the cam 48 as shown in FIGS. 5 and 6. A lower edge of the cam 48 includes a slot 51 formed as an elliptical surface. The cam 48 further includes flat stepped edge portions 55a, 55b spaced radially outwardly from the slot 51 along the lower edge of the cam. The inward flat edge portion 55b extends inwardly into the cam 48 more than the outermost flat edge portion 55a.

The cam apparatus 45 also includes a crank arm 52 having an opening on one end thereof for fixed securement to a rotatable shaft as will be described later. The crank arm 52 has a cam follower roller 54 secured on the opposing end thereof. The cam follower roller 54 extends outwardly beyond the edge of the crank arm 52 as shown in FIGS. 5 and 6. The crank arm 52 is aligned in substantially the same plane as the cam 48.

The cam apparatus 45 further includes a stop support 56 fixedly secured to the end wall 31a of the electronics and power supply housing 30. The stop support 56 includes an upwardly extending main stop 57 and an upwardly extending auxiliary wheel position limit sensor 58 extending upwardly more than the main stop 57. The auxiliary wheel position limit sensor 58 can be provided at any other appropriate location. The auxiliary wheel position limit sensor 58 can be responsive to movement of the cam 48 or crank arm 52 to the raised position. The auxiliary wheel position limit sensor 58 preferably is provided as a contact switch adjacent stop 57 so that when the cam 48 contacts the stop in a rest position, a signal indicating engagement of the auxiliary wheel 34 with the floor is provided to a decision/drive circuit 182 which will be discussed in detail later.

The auxiliary wheel position limit sensor 58 can also comprise various types of electrical switches or be formed by non-switch electrical components. For example, a potentiometer rotatable with rotation of the shaft 62 can be used to provide a signal indicating the position of the auxiliary wheel 34. Other pressure or position sensors can also be utilized.

Control Apparatus

FIGS. 7 and 8 illustrate a control apparatus 60 for controlling operation of the cam apparatus 45. The control apparatus 60 includes a manipulative member 61, such as a foot pedal, fixedly secured to a rotatable shaft 62, and elements of the cam apparatus 45. The manipulative member 61 is secured to an end of the rotatable shaft 62 and the opposing end of the shaft is fixedly secured in the opening of the crank arm 52. As shown in FIGS. 7 and 8, the rotatable shaft 62 extends through or under the electronics and power supply housing 30 from the end 21 of the wheeled base 15 to the cam apparatus 45.

Operation of the Auxiliary Wheel Mechanism

The wheeled carriage 14 includes the auxiliary wheel 34 positioned under the patient support 16 and preferably centered with respect to the length and width of the wheeled carriage as shown in FIG. 1.

In use, the auxiliary wheel 34 is retracted from the floor for movement of the wheeled carriage 14 in a number of directions within a confined space. When the wheeled carriage 14 is intended to go a distance in a substantially straight direction, for example along a hallway, the auxiliary wheel 34 is deployed.

When deployed, the auxiliary wheel 34 is positioned on the floor level with the castered wheels. The auxiliary wheel 34 can support a part of the weight of the wheeled carriage 14 at a central point. Thus the force applied to the castered wheels 24 can be reduced. Drive motor 44 then drives the auxiliary wheel 34 and powers the wheeled carriage 14 in a first direction or a second opposing direction as will be described later in detail.

In operation, the control apparatus 60 moves the auxiliary wheel 34 between a first position engaging the floor and a second position retracted above the floor as shown in FIGS. 7 and 8. The control apparatus 60 is controlled by an operator stepping on the manipulative member 61, shown as a two position pedal in FIGS. 7 and 8. As shown in FIGS. 5 and 7, when the two position pedal is pushed to the right as viewed from the front of the wheeled carriage 14, the shaft then rotates in a clockwise direction as viewed from the front. The crank arm 52 rotates with the shaft 62. The crank arm 52 rotates to the left, as viewed from the middle of the wheeled base 15 and toward the forward direction as shown in FIG. 5. The cam follower roller 54 moves along the elliptical slot 51 of the cam 48 raising the end thereof spaced outwardly from the cam pivot pin 49 shown in FIGS. 3 and 4. As the cam 48 pivots upwardly, the cam roller 50 contacts the base 37 of the auxiliary wheel spring support 33. The cam roller 50 moves along the bottom surface of the base 37 while the rotation of the cam 48 drives the base, and therefore raises the base 37 and thus the auxiliary drive wheel 34 upwardly to the position shown in FIGS. 5 and 7.

When the cam follower roller 54 reaches the end of the elliptical slot 51, as shown in FIG. 5, the crank arm 52 stops pivoting. At the position shown in FIG. 5, the crank arm 52 is supported or effectively locked in place because of the angle of the crank arm beyond a vertical position and the curvature of the elliptical slot 51. In this manner, a greatly simplified cam apparatus 45 requiring no separate locking mechanism is provided.

Lifting of the unsupported base 37 increases the force opposing the downward movement of the auxiliary wheel spring support 33. In the upward position, shown in FIGS. 3, 5 and 7, the auxiliary wheel spring support 33 is moved upwardly by the force of the cam apparatus 45 so that the auxiliary wheel 34 does not contact the floor. As best shown in FIG. 7, the unsupported base 37 is raised upwardly at the end adjacent to the auxiliary wheel 34 by an amount sufficient to lift the auxiliary wheel and to bend the auxiliary wheel spring support 33 which preferably comprises a spring steel leaf spring including opening 40.

By using a spring steel member, such as a shaped steel leaf spring, for the auxiliary wheel spring support 33, improved results can be obtained. For example, the cut-out shape of the auxiliary wheel spring support 33 controls spring force to provide the greatest amount of deflection of the spring support with an appropriate force.

The width of the arms 38a, 38b of the auxiliary wheel spring support 33 are selected to control the spring rate of the spring support so that an appropriate downward force is applied to the floor or ground.

The preselected large radius of the opening 40 having a semicircular shape at the supported base 36 of the auxiliary wheel spring support 33 assists in distributing load and minimizing stress.

The bend 39 in auxiliary wheel spring support 33 enables the unsecured base 37 to remain in a substantially horizontal position although the spring support is flexed. Further, the horizontal position of the auxiliary wheel spring support 33 prevents the base 37 from rising and contacting the patient support 16 when the patient support is in a lowered position.

By having the opening 40 closed about the entire perimeter thereof, the unsupported base 37 of the auxiliary wheel spring support 33 is prevented from twisting or turning relative to the supported base 36. For example, uneven forces applied to the auxiliary wheel 34 by uneven ground or flooring do not twist or turn the auxiliary wheel spring support 33.

The control apparatus 60 moves the auxiliary wheel 34 between a second position retracted above the floor and a first position engaging the floor as shown in FIGS. 7 and 8. The control apparatus 60 is controlled by an operator stepping on the manipulative member 61. As shown in FIGS. 6 and 8, when the pedal is pushed to the left as viewed from the front of the wheeled carriage 14, the shaft 62 then rotates in a counterclockwise direction as viewed from the front. The crank arm 52 rotates with the shaft 62. The crank arm 52 rotates to the right, as viewed toward the forward direction and as shown in FIG. 6. The cam follower roller 54 moves along the elliptical slot 51 of the cam 48 lowering the end thereof spaced outwardly from the cam pivot pin 49 shown in FIGS. 3 and 4. As the cam 48 pivots and moves downwardly, the cam roller 50 lowers with respect to the plate 39 of the auxiliary wheel spring support 33. The cam roller 50 moves along the bottom surface of the plate 39 while the rotation of the cam 48 drives the plate, and then releases entirely the plate and the auxiliary drive wheel 34 to the final position shown in FIGS. 6 and 8.

When the cam follower roller 54 reaches the end of the elliptical slot 51, as shown in FIG. 6, the crank arm 52 stops pivoting. At the position shown in FIG. 6 main stop 57 prevents overtravel of the cam 48. Therefore, the cam 48 cannot rotate to a location adjacent or in contact with the floor.

The crank arm 52 is supported or effectively locked in place because of the angle of the crank arm 52 extending beyond a vertical position and the curvature of the elliptical slot 51. In this manner, a greatly simplified cam apparatus 45 requiring no locking mechanism for the lowered or raised position of the auxiliary wheel 34 is provided.

Lowering of the plate 39 removes the force opposing the downward movement of the auxiliary wheel spring support 33 with respect to the cam apparatus 45. In the released position, shown in FIGS. 4, 6 and 8, the auxiliary wheel spring support 33 applies force only to the floor contacting and supporting the auxiliary wheel 34. As best shown in FIG. 8, the plate 39 is at rest, but remains slightly upward with respect to the frame bars 27, 28 because of the force of the floor opposing the auxiliary wheel 34 and thus the auxiliary wheel spring support 33.

As illustrated in FIG. 8, the curved shape for the auxiliary wheel spring support 33, preferably a spring steel member, is caused by the downward angle from perpendicular, of the mounted position of the spring steel member on the end frame member 26. The type and thickness of the spring steel member can also be selected to generate a particular result.

In this invention, the auxiliary wheel 34 preferably applies or receives a force corresponding to about 150 pounds when deployed on a level floor. Since the auxiliary wheel 34 is driven by drive motor 44 of the drive motor assembly 42, the downward force on the auxiliary wheel improves the drive capability thereof.

The auxiliary wheel spring support 33 can flex or bend as needed to maintain contact with the floor when the wheeled carriage 14 moves over bumps, ramps, or other flooring that provides the auxiliary wheel 34 with a different relative height than the castered wheels 24. Therefore, the auxiliary wheel 34 can move upwardly to avoid teetering of the wheeled carriage 14.

By enabling the auxiliary wheel 34 to be uncontacted by the cam apparatus 45 in the deployed position, the overall arrangement of the control apparatus 60 is greatly simplified. This arrangement reduces the likelihood of failure of elements and thus the entire auxiliary wheel mechanism 32. Therefore, having only the auxiliary wheel spring support 33 bias the auxiliary wheel 34 is advantageous.

In conclusion, operation of the above disclosed control apparatus 60, cam apparatus 45 and auxiliary wheel mechanism 32 provide a simplified operation by requiring fewer elements to move the auxiliary wheel 34 between a first position engaging the floor and a second retracted position removed from the floor.

Front Panel Elements

A front section 65 adjacent the patient support 16 at the front end thereof includes IV holders 66 or the like and electrical inlets/outlets for the transfer of electrical communications signals, data or energy as shown in FIG. 1 with the display panel 80 (illustrated in FIG. 11) removed. The front section 65 also includes a mounting plate 69. A drive handle 70 has a bight 71 and respective handle ends 72, 73. The handle ends 72, 73 are fixedly secured to rotatable shaft elements 75, 76 as shown in FIG. 9.

Figure 9:
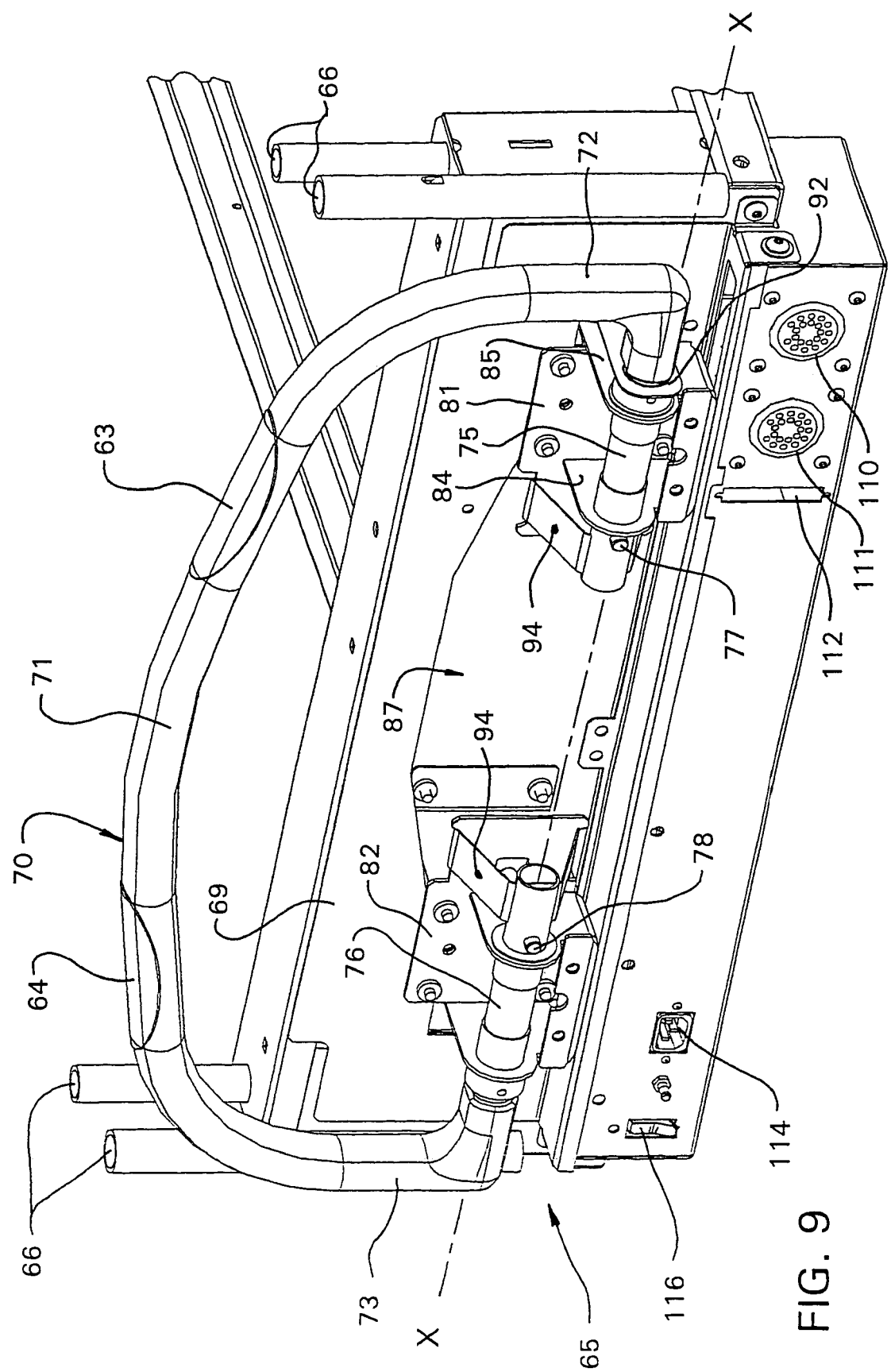
FIG. 9 is a isometric view showing a front panel of the wheeled carriage.

FIG. 9 better illustrates the invention. Rotatable shaft elements 75, 76 have respective pin elements 77, 78 to prevent axial movement of the shaft elements 75, 76 or the handle ends 72, 73. The respective shaft elements 75, 76 are received by respective handle end support brackets 81, 82.

As shown in FIG. 9, motion safety sensors 63, 64 are preferably provided as motion safety spring switches mounted on opposing sides of the bight 71 of the drive handle 70. Grasping or squeezing the drive handle 70 at either section corresponding to either safety sensor 63, 64 closes an electrical circuit. While two motion safety sensors 63, 64, are shown in FIG. 9, any number including a single sensor can be utilized. Further, while the motion safety sensors 63, 64 are preferably mounted integral with the drive handle 70 as shown in FIG. 9, the motion safety sensors can also be mounted as separate elements mounted elsewhere on the wheeled carriage 14. The motion safety sensors 63, 64 can also comprise pressure sensors sensing air or liquid pressure in a flexible member deformed by an operator's hand, capacitive elements detecting the presence of an operator's hand or other types of sensors, as well as deadman type switches.

Figure 10:
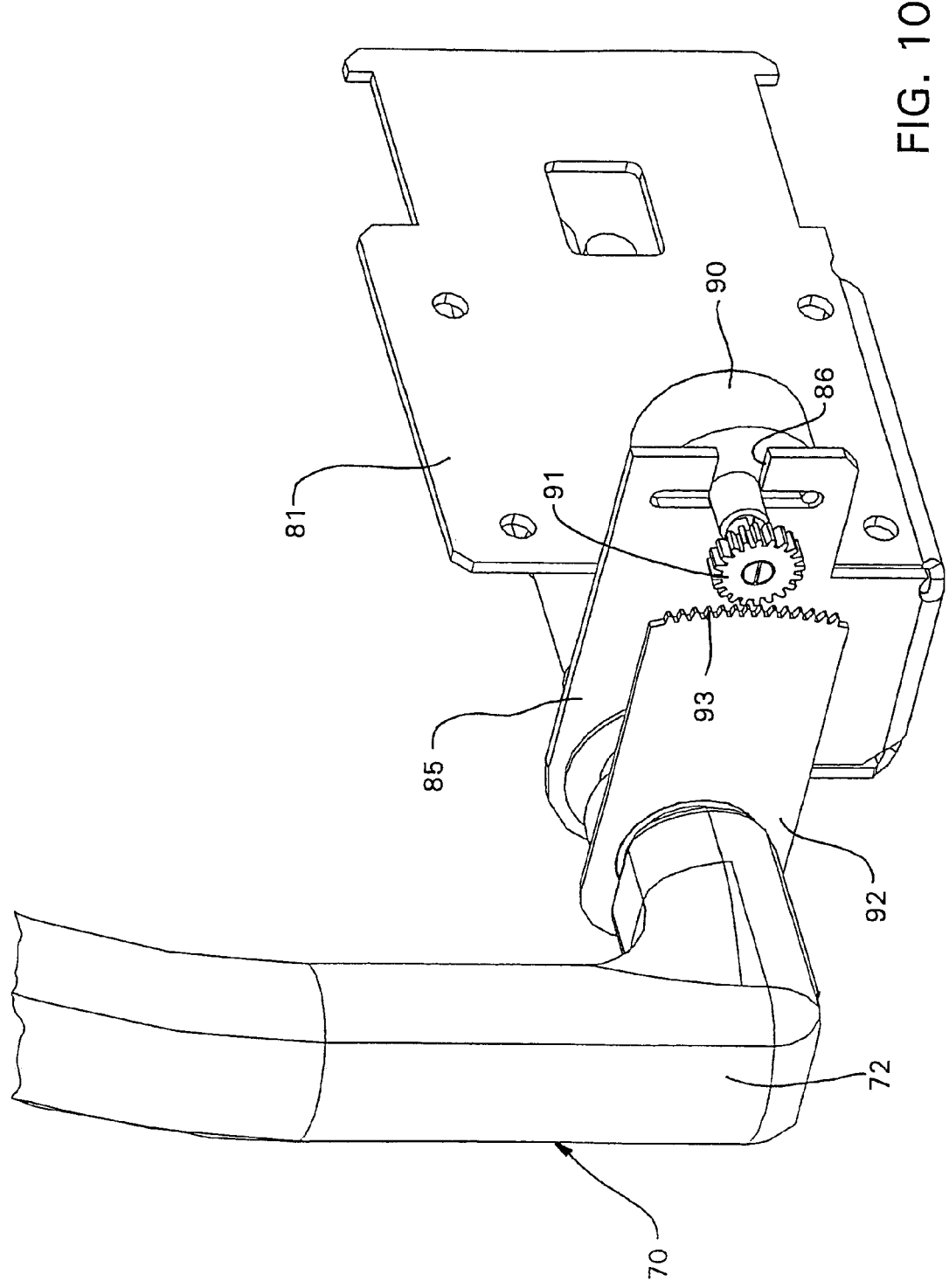
FIG. 10 is a close-up view of a portion of the drive handle and a potentiometer connected thereto.

The handle end support bracket 81 includes a shaft receiving member 84 protruding outwardly thereof and having an aperture for receiving the shaft element 75. The shaft receiving member 84 enables rotation of the shaft element 75 about an axis X—X. The handle end support bracket 81 also includes a potentiometer support member 85 secured to at least an edge of the handle end support bracket 81. The potentiometer support member 85 has an opening on one end thereof to receive the rotatable shaft element 75 and enable free rotation thereof. The potentiometer support member 85 includes a slot 86 on the opposing end thereof. As shown in FIG. 10, the slot 86 receives a potentiometer 90 having a variable resistor 96 and a toothed gear 91.

A potentiometer actuator element 92, shown in FIG. 10 includes an opening at a first end thereof to fixedly receive the rotatable shaft element 75. The opposing end of the potentiometer actuator element 92 includes a pattern of teeth 93 matching the teeth of the toothed gear 91 of the potentiometer 90.

The potentiometer actuator element 92 is fixedly secured to the handle end 72 or the rotatable shaft element 75. The rotatable shaft element 75 is freely rotatable with respect to the potentiometer support 85 and the shaft receiving member 84.

The handle end support bracket 81 further receives and supports a handle biasing element 94, such as a leaf spring, at two ends thereof. The biasing element 94 extends through or is secured to a side of the rotatable shaft element. The biasing element 94 attempts to retain and maintain the drive handle 70 at a selected position. Preferably a force of at least ten pounds is required to overcome the handle biasing elements 94 and to move the drive handle 70 far enough in either direction to operate the auxiliary wheel 34.

The opposing handle end 73, rotatable shaft element 76, and handle support bracket 82 have the same elements and function in the same manner as the above described arrangement for the elements at the handle end 72. Therefore, the various elements and linkages therebetween will not be described herein.

FIG. 9 shows at a lower portion thereof various connector elements of the invention optional ports 110, 111 are used for pendant control devices. For example, cables connecting to remote hand controls for use by patients can control bed settings. Bed settings include controlling the height of the back rest and leg rest. An additional port 112 is shown for connection to wall systems, for example a nurses station or TV controller. Power input connector element 114 is capable of mating with an external electrical cable to receive A/C power therefrom. ON/OFF rocker switch 116 in FIG. 9, shuts off entirely or disconnects all electrical functions of the wheeled carriage 14.

Drive Handle Operation of the Auxiliary Wheel

In operation, the drive handle 70 and potentiometer 90 are utilized to power the drive motor 44 and thus drive the auxiliary wheel 34. In this manner, the wheeled carriage 14 comprises a power assisted wheeled carriage enabling greater ease in moving the carriage to various locations.

Movement of the drive handle 70 in the forward direction toward the patient support 16 rotates the handle about the axis X—X shown in FIG. 9. Such rotation of the drive handle 70 also pivots or rotates the potentiometer actuator 92 downwardly with respect to the potentiometer 90. The downward movement of the teeth 93 of the potentiometer actuator 92 rotates the potentiometer 90 in an opposing direction due to contact of the teeth 93 with the toothed gear 91 of the potentiometer.

Movement of the drive handle 70 in the opposite direction away from the patient support 16 about the axis X—X rotates the toothed gear 91 of the potentiometer 90 in the opposite direction.

When the auxiliary wheel 34 is stowed, the drive handle 70 is disabled from controlling the drive motor 44. In this condition, the drive handle 70 can be used to manually push and pull the wheeled carriage 14.

The drive handle 70 has two functions. When the auxiliary wheel 34 is stowed, the drive handle 70 operates as a conventional carriage handle, with some degree of movement that is opposed by the handle biasing elements 94. When the auxiliary wheel 34 is deployed, the drive handle 70 acts to control which of two opposing directions the wheeled carriage 14 is driven and the speed thereof.

Handle biasing elements 94, such as leaf springs, return the drive handle 70 to an upright or neutral position upon release of the drive handle regardless of the direction of rotation of the drive handle. In this manner, the potentiometer 90 returns to the same position after movement by an operator.

Rotation of the toothed gear 91 varies the output resistance of the potentiometer 90. Rotation of the toothed gear 91 also moves the wiper 97 changing the resistance of the potentiometer 90 and thus the sensed current and voltage applied to the CPU 166 shown in FIG. 13.

For example, in one embodiment, movement of the drive handle 70 in the forward direction about the axis X—X can increase the voltage sensed by the CPU 166 and rotation of the drive handle away from the patient support 16 can decrease the voltage applied to the CPU.

Display/Control Panel

Figure 11:
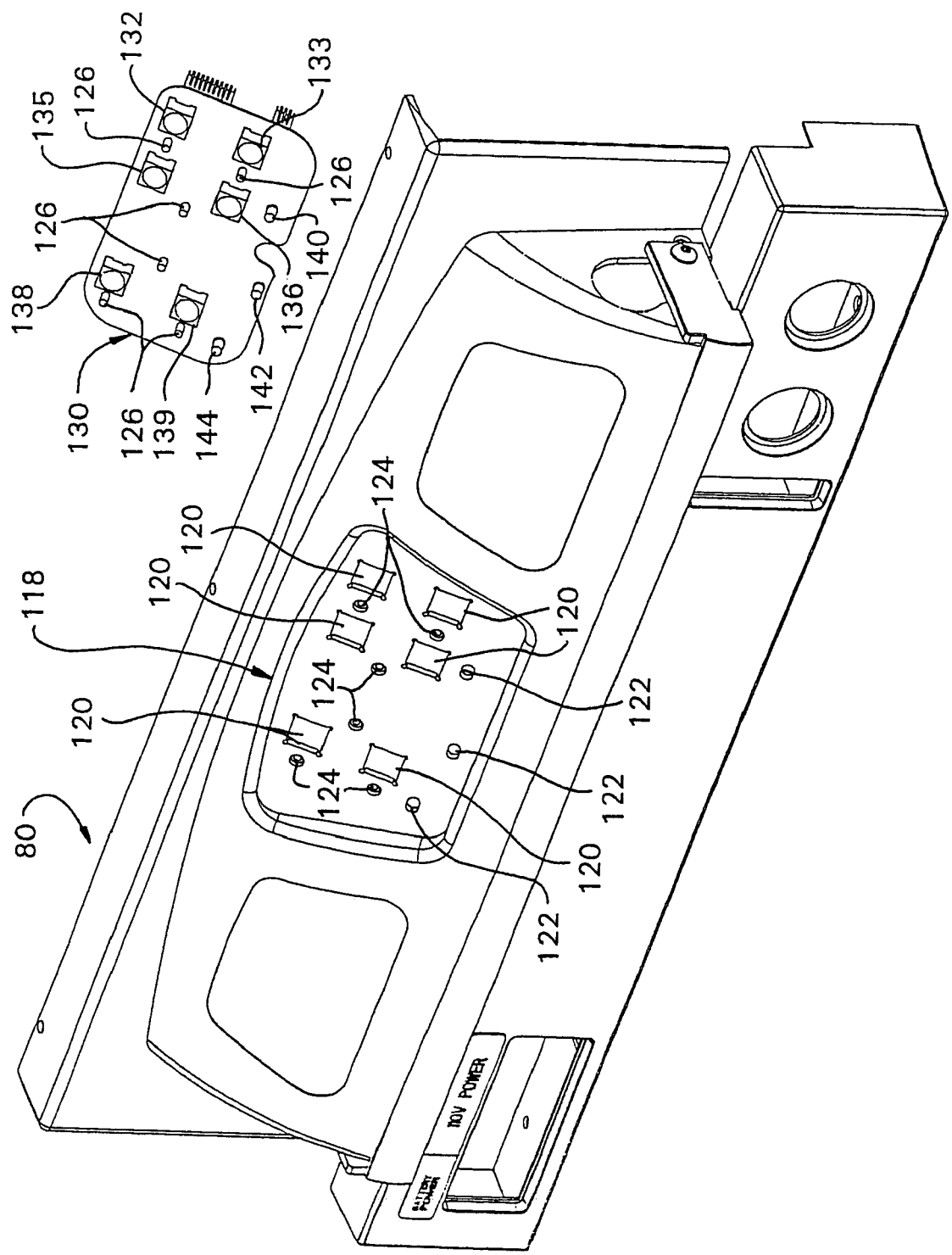
FIG. 11 is a display/control panel containing a circuit board for positioning over the front panel of FIG. 9.

FIG. 11 shows display/control panel 80 and a corresponding circuit board 130. Display/control panel 80 includes a display/control section 118 having switch openings 120 for receiving control switches. The display/control panel 80 also includes openings 122 for receiving indicators 140, 142, 144, such as light emitting diodes (LEDs). The display/control panel 80 fits over the front of mounting plate 69 of the wheeled carriage 14 and covers the opening 87 shown in FIG. 9. Mounting apertures 124 on the display/control section 118 correspond to mounting pins 126 projecting from the circuit board 130.

The circuit board 130 supports control switches 132–133, 135–136 and 138–139. Back position control switches 132, 133 are used to lower or raise a back section of the patient support 16 of the wheeled carriage 14. Back position control switch 132 raises the back section and thus the back of a patient.

Knee position switches 135, 136 control the raising or lowering (up/down) control of a knee section of the patient support 16. The knee position switch 135 raises the knees upwardly and the knee position switch 136 lowers the knee section and moves the knee section toward a flat horizontal position.

The carriage height control switches 138, 139 enable vertical adjustment of the entire patient support 16. The control switch 138 triggers telescoping screw lifts 18, 19 which move the entire patient support 16 upwardly. Control switch 139 moves the patient support downwardly.

The above control switches that move the patient support are generally well known in the prior art. The patient support control system and apparatus for positioning the patient support are also generally well known in the prior art and are part of a separate circuit from applicants' decision/drive circuit and auxiliary wheel drive power circuit disclosed herein. AC motors (not shown) are known for moving the knee section, the back section, and the entire patient support. The known patient support control system can use DC batteries for power. Therefore, applicants' patient support control system is not described or shown in detail.

The circuit board 130 can include a separate computer processing unit CPU (different from that shown in FIG. 13) such as a microprocessor or other preferably separate digital circuit and various electronics for controlling the various functions of the patient support 16 depending on actuation of the control switches. In other embodiments, a single CPU, such as a computer processing unit 166 shown in FIG. 13 can control all of the patient support, the auxiliary wheel drive circuit and the decision/drive circuit.

As shown in FIG. 11, indicators 140, 142, 144 are supported on circuit board 130 and project through openings 122 of the display/control section 118. Brake condition indicator 140 illuminates or flashes to indicate the brake of the wheeled carriage 14 is locked or set so the wheeled carriage 14 cannot move or be driven. Low battery indicator 142 illuminates or flashes to show that the battery is low and requires charging or replacement. Drive wheel indicator 144 indicates if the auxiliary wheel 34 is in the raised position and thus unable to drive the wheeled carriage 14.

Auxiliary Wheel Power Drive Circuit

Figure 12:
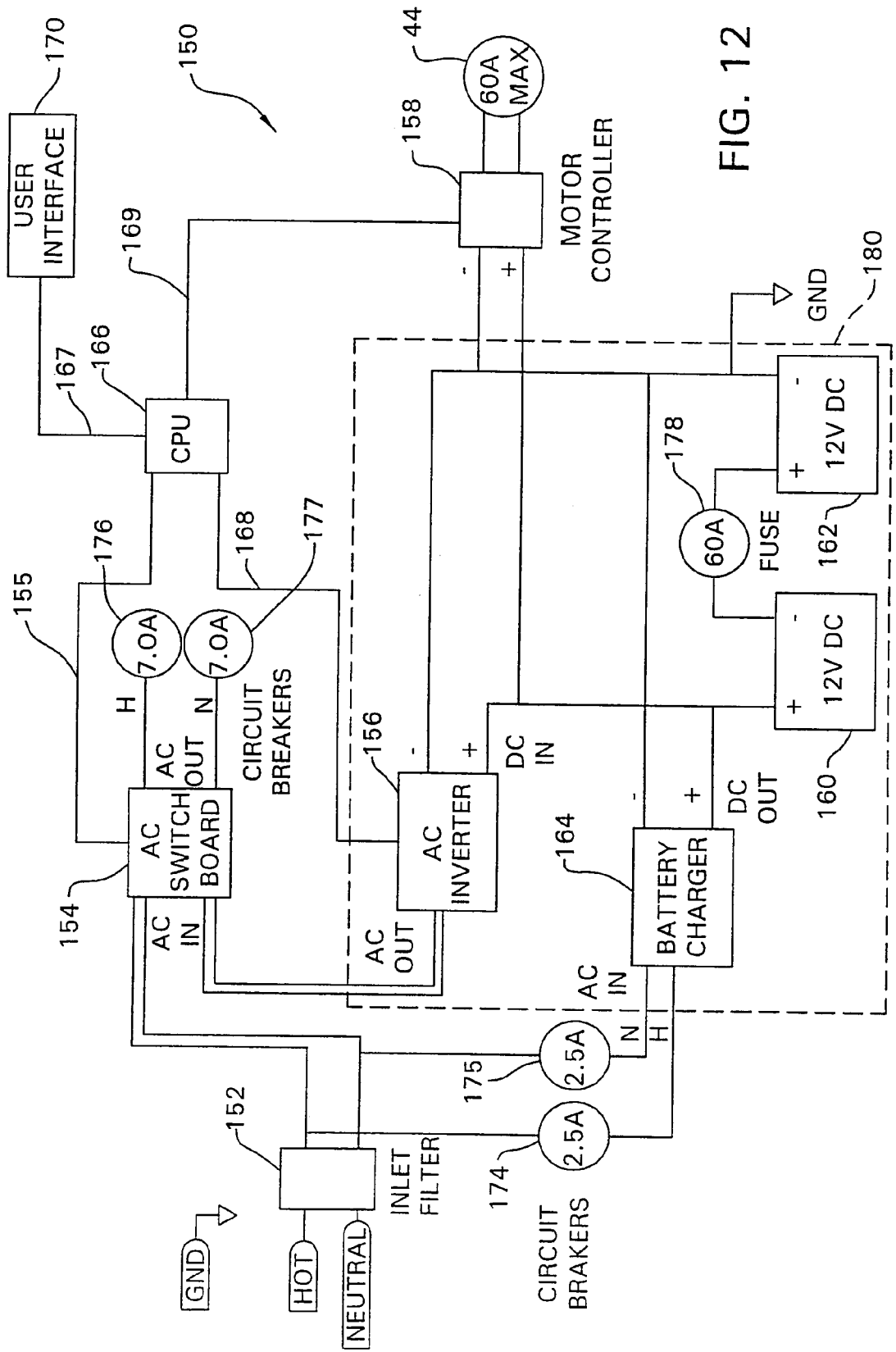
FIG. 12 is an auxiliary wheel power drive circuit for powering the drive motor.

FIG. 12 shows a preferred auxiliary wheel power drive circuit 150 for driving the auxiliary wheel 34. The power drive circuit 150 includes an inlet filter 152 which receives an input power supply voltage via a power cable from a standard AC 110 volt/60 Hz electrical outlet. The voltage output by the inlet filter 152 branches in two directions. A first branch of the AC voltage passing through the inlet filter 152 travels to an AC switch board 154. The AC switch board 154 senses the presence of AC voltage. If AC voltage is present, a signal is sent on low voltage limited energy signal line 155 to a computer processing unit (CPU) 166, preferably a microprocessor or other digital circuitry for performing calculating and control functions.

If AC voltage is present from a wall outlet, CPU 166 sends an OFF signal along signal line 168 disabling AC invertor 156. Thus, the AC invertor does not operate when AC voltage provided from a standard wall outlet powers AC switch board 154. DC battery charger 164 converts the AC voltage into DC voltage and charges batteries 160, 162.

When no AC voltage is present at AC switch board 154, the AC invertor 156 operates to convert the DC voltage input from batteries 160, 162 into an AC voltage which is output to AC switch board 154 for distribution to various AC powered electrical devices. The DC input voltage for invertor 156 is provided by parallel connections across series connected DC batteries 160, 162.

Batteries 160, 162 typically comprise first and second DC batteries (12 Volts each) connected in series with a fuse therebetween. The batteries 160, 162 can supply power to all of the electrical elements of the wheeled carriage 14, and not just those illustrated in FIG. 12. In other embodiments, the batteries can comprise a single battery having an appropriate predetermined voltage.

In operation, AC/DC battery charger 164 directly receives the AC power output through inlet filter 152. When the input connector element 114 shown in FIG. 9 is plugged by an electrical cable into an energized wall outlet, the DC battery charger 164 converts the standard 110 volt/60 hz AC power provided into an output DC voltage of at least 24 volts to charge the batteries 160, 162.

As shown in FIG. 12, CPU 166 sends out low voltage signals on signal lines 167–169. Signal line 167 connects to user/operator interface 170. Signal line 168 connects to AC invertor 156 as discussed earlier and signal line 169 connects to drive motor controller 158.

Circuit breakers 174–177 and fuse 178 prevent damage of and protect the auxiliary wheel drive circuit 150 due to dangerous conditions, such as short circuits, or other defects.

The portion of FIG. 12 contained in dashed lines 180 preferably is housed in the electronics and power supply housing 30. The auxiliary wheel drive motor 44 is positioned adjacent the auxiliary wheel 34 in drive motor housing 43. The drive motor controller 158 can be positioned adjacent the auxiliary wheel drive motor 44 or in the electronics and power supply housing 30. The remaining elements of FIG. 12 are generally located inside of, or are positioned near display/control panel 80. Other physical arrangements for the elements illustrated in FIG. 12 are also possible.

Electrical Decision/Drive Circuit (Controller)

Figure 13:
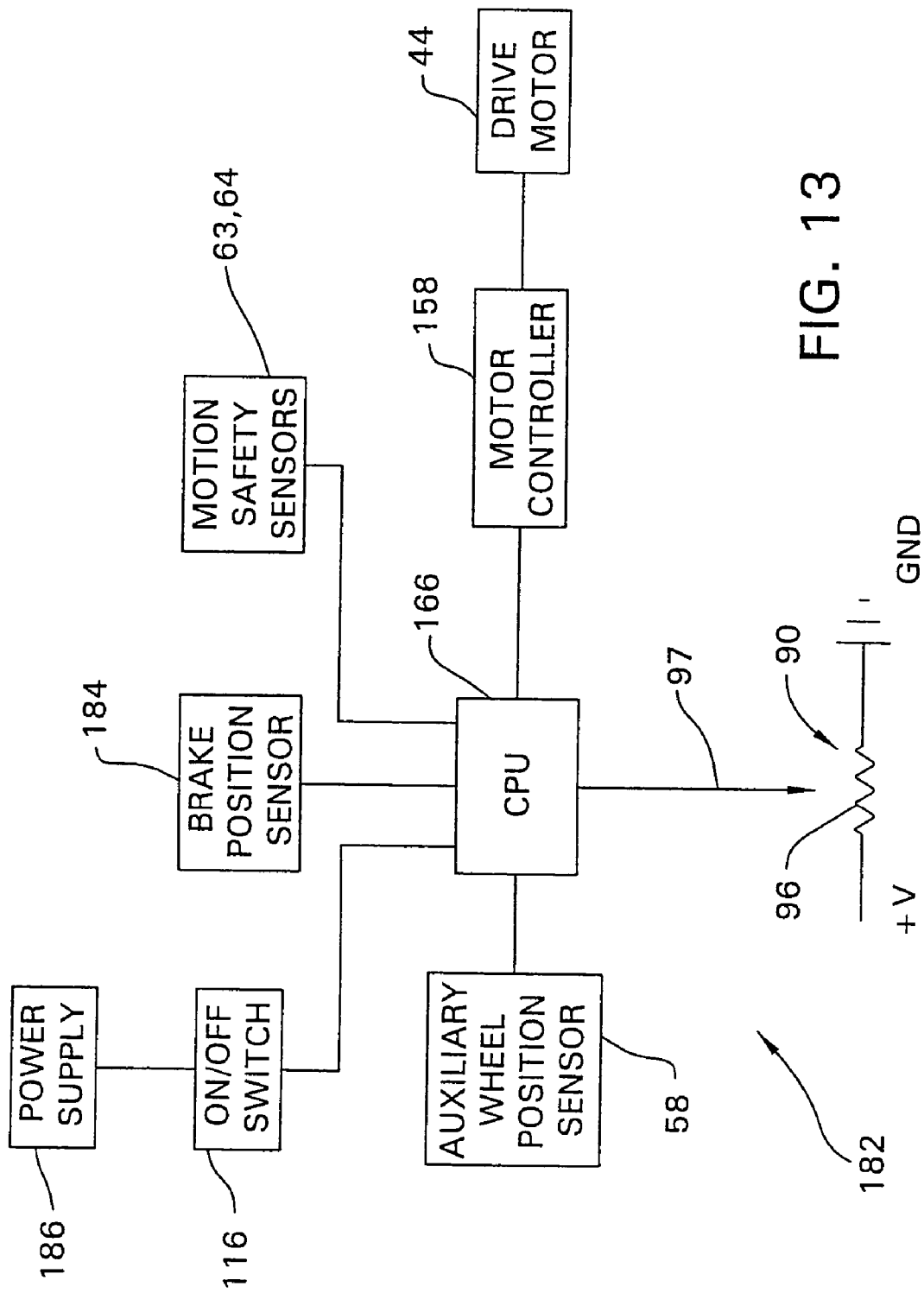
FIG. 13 is an electrical decision/drive circuit for selectively controlling the drive motor that powers the auxiliary wheel.

FIG. 13 shows a schematic of a preferred electrical decision/drive circuit 182 including the potentiometer 90. The potentiometer 90 includes a resistor 96 and a wiper 97. The resistance value of the potentiometer 90 changes as the wiper 97 moves relative to resistor 96 during rotation of the potentiometer due to toothed gear 91 as described earlier.

As shown in FIG. 13, the electrical decision/drive circuit 182 includes the motion safety sensors 63, 64 for enabling operation of the drive motor 44. Potentiometer 90 provides velocity and direction signals. The ON/OFF switch 116 selectively powers the wheeled carriage 14. The auxiliary wheel position limit sensor 58 senses auxiliary wheel position and brake position sensor 184 senses brake position. These elements correspond in part to the user/operator interface 170 shown in FIG. 12. The above elements show that signal line 167, which can represent multiple signal lines, generally provides more input signals to the CPU 166 than output signals it receives from the CPU.

FIG. 13 also shows a power supply 186 representing the pair of batteries 160, 162 and fuse 178. The power supply 102 can supply power to all of the elements illustrated in FIG. 13 via ON/OFF switch 116 (connections not shown). The power supply 102 is located in the power supply housing 30.

Brake position sensor 184 preferably includes a conventional electrical switch which closes when the brake is actuated.

Operation of the Decision/Drive and Auxiliary Wheel Power Drive Circuits

Operation of the electrical decision/drive circuit 182 is illustrated as follows by main wheeled carriage drive operating software program 187 shown in the block diagram of FIG. 14.

The operating steps of the main wheeled carriage drive operating program 187 are as follows. Upon actuation of ON/OFF rocker switch 116, the system is initialized as illustrated by block 188. Such initialization is well known in the computer arts. Then the CPU 166 decides if either motion safety sensor 63, 64 is closed as illustrated by decision block 189. If one of the motion safety sensors 63, 64 is closed, the drive operating program 187 returns and retests until the motion safety sensor is open. This retesting is important to prevent the possibility of the wheeled carriage 14 moving immediately when the electrical decision/drive circuit 182 is started. In this way no accident is caused by an operator or driver inadvertently closing one of the motion safety sensors 63, 64 while biasing the drive handle 70 and throwing the ON/OFF rocker switch 116.

Assuming the safety sensors 63, 64 are both open, the main operating program 187 advances to block 190 where the AC invertor 156 is enabled when the input connector element 114 is not plugged into a standard electrical outlet by a power cable. When enabled by CPU 166 as shown in FIG. 12, the AC invertor 156 converts DC voltage into AC voltage and provides power to the AC switch board 154. When external electrical power is provided to the auxiliary wheel drive power circuit 150, the AC invertor 156 is not operated and the AC switch board 154 receives AC power through the connecter element 144 to power the electrical decision/drive circuit 182.

The operating program 187 then advances to decision block 191 where the CPU 166 detects the status of the auxiliary wheel position sensor 58 and the brake position sensor 184. If the auxiliary wheel position is raised and/or the brake is set, the CPU 166 lights the respective indicator (s) 140, 144 as represented by block 192. In this way, a carriage operator can immediately see if the wheeled carriage 14 is in condition to be driven. If neither condition is met, the indicator(s) 140, 144 are not illuminated and the operator can drive the wheeled carriage 14.

No matter which block 192, 193 the main operating program 187 advances to, battery test subroutine 194 as represented by block 194 is then called. The battery test subroutine 194 will be explained in detail later. The purpose of the battery test subroutine 194 is to provide an indication of a need to charge the batteries 160, 162 and to shut off operation of the wheeled carriage 14, if the battery voltage decreases too much.

After testing the batteries 160, 162, the main operating program 187 advances to decision block 195. Operation of the AC invertor 156, auxiliary wheel position sensor 58, brake position sensor 184 and motion safety sensors 63, 64 is sensed. Assuming the AC invertor outputs power (the carriage 14 is not plugged into a wall outlet), if the auxiliary wheel position limit sensor 58 senses the auxiliary wheel 34 is lowered and thus contacting the floor, the brake position sensor senses the brake is released, and at least one of the motion safety sensors 63, 64 is grasped and thus closed, the main operating program 187 advances to auxiliary wheel drive subroutine 196.

The auxiliary wheel drive subroutine 196 which will be described in more detail later, enables driving of the auxiliary wheel 34 of the wheeled carriage 14 in forward and reverse directions in a controlled manner that will be explained in detail later. The speed of the wheeled carriage 14 depends in large part on the direction and amount of movement of the drive handle 70 as described earlier.

After calling the auxiliary wheel drive subroutine 196, the main drive operating program 187 advances to timeout subroutine 197. The main drive program 187 also advances to timeout subroutine 197 even if the drive subroutine 196 is not selected.

The timeout subroutine 197 which will be described in more detail later, provides assurance that if the motion safety sensors 63, 64 are tampered with and intentionally fixed in a closed position by an operator, the wheeled carriage 14 will not be driven improperly. Therefore, accidents caused by misuse of the motion safety sensors 63, 64 can be avoided.

Battery Test Subroutine

Figure 15:
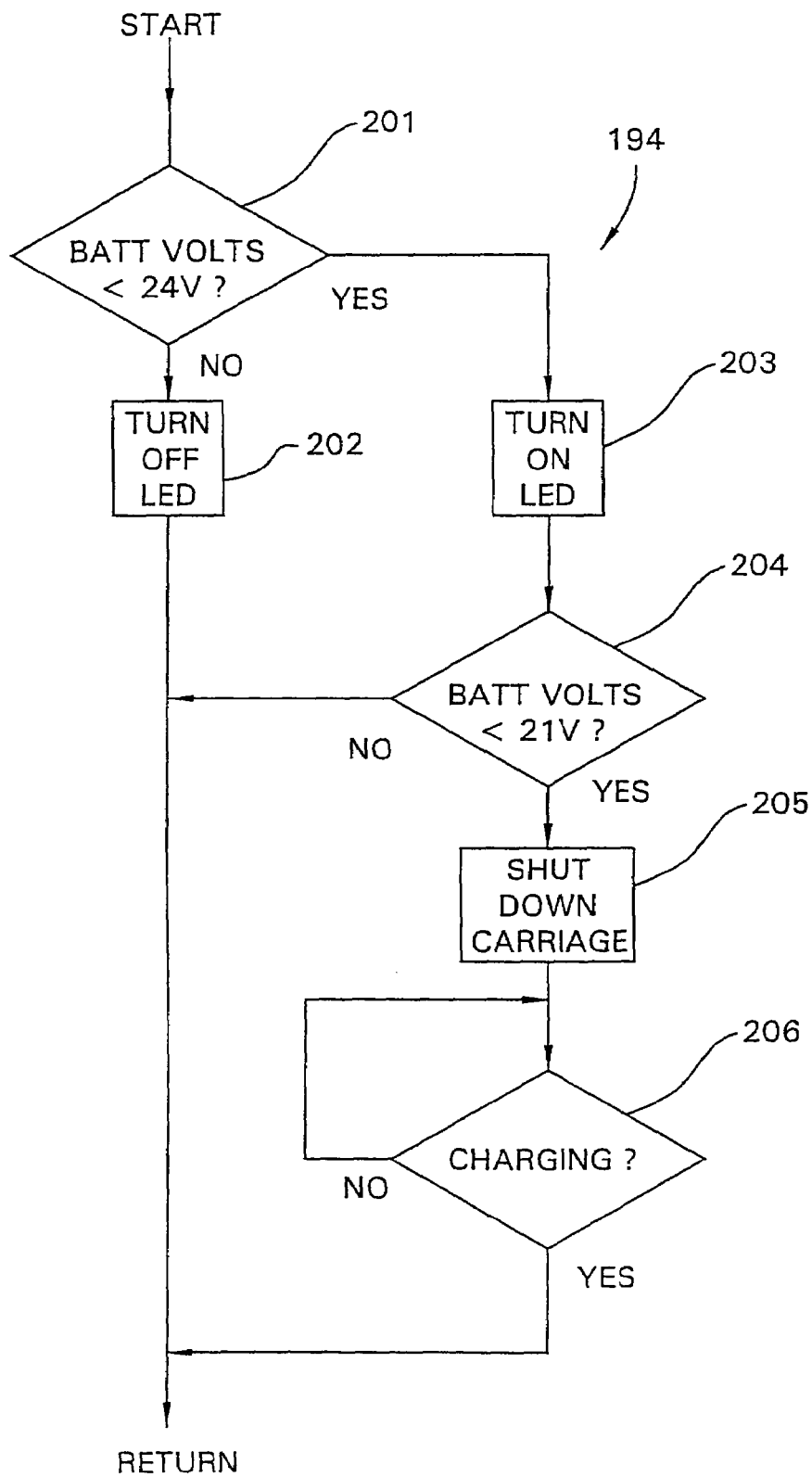
FIG. 15 is a block diagram of a battery test subroutine of the main wheeled carriage drive operating program.

A preferred battery test subroutine 194 is illustrated in block diagram form in FIG. 15. Upon selection of the battery test subroutine 194, the combined voltage of the series connected batteries 160, 162 is measured as shown at decision block 201, preferably over a time period of five seconds. If the voltage does not remain below a first predetermined voltage, preferably 24 volts, for the entire time period, the battery test subroutine 194 advances to block 202 and turns off or keeps off the low battery indicator 142. The battery test subroutine 194 then returns back to the main subroutine 187.

In the event the voltages remains below 24 volts for the entire time period, the decision block 201 forwards to block 203 which turns on the battery indicator 142. Thus, a low battery state is communicated to an operator who can then connect the auxiliary wheel drive power circuit 150 of the wheeled carriage 14 to a conventional wall outlet.

Then the battery test subroutine 194 advances to decision block 204 which measures or senses if the combined voltage of the series connected batteries 160, 162 is greater than a second selected predetermined voltage during a second predetermined time period, preferably of two to five seconds. If the voltage of the connected batteries does not remain below the second selected predetermined voltage, preferably 21 volts, the entire second time period the decision block 204 exits the battery test subroutine 194.

In instances where the voltage of the batteries is below 21 volts for the entire second predetermined time period, the battery test subroutine 194 forwards to step 205 which shuts down battery power for the wheeled carriage 14. Such shutdown prevents depletion of the batteries 160, 162 to a level so low that the batteries cannot operate the auxiliary wheel drive power circuit 150 properly. In conclusion, the low battery indicator 142 remains on to tell a operator that the batteries 160, 162 must be charged, even when the wheeled carriage 14 is disabled.

The battery test subroutine 194 then advances to decision block 206 representing charging of the batteries 160, 162. The decision block 206 returns to the main routine 187 if battery charger 164 is charging the batteries 160, 162. If charging is not occurring, the battery test subroutine 194 shows a return to the decision block 206 until charging (connection of the auxiliary wheel drive power circuit 150 to an electrical outlet) occurs.

The charging decision block 206 and return path appear to act as a closed loop, waiting for an indication of charging indefinitely. This is not necessarily the situation. For example, as set forth earlier, decision block 201 preferably senses battery voltage for a period of five seconds before deciding if the voltage is low and battery indicator 140 should be enabled. The electrical decision/drive circuit 182 generally does not contemplate waiting five seconds to measure a voltage or to perform any other step. The main operating program 187 can continue to execute and measure a voltage every time the program clocks through the battery test subroutine 194 until a time period of five seconds passes. Therefore, the block diagrams herein are for purposes of illustration only, and do not explain every operation or possible operation of the preferred electrical decision/drive circuit 182.

Auxiliary Wheel Drive Subroutine

Figure 16:
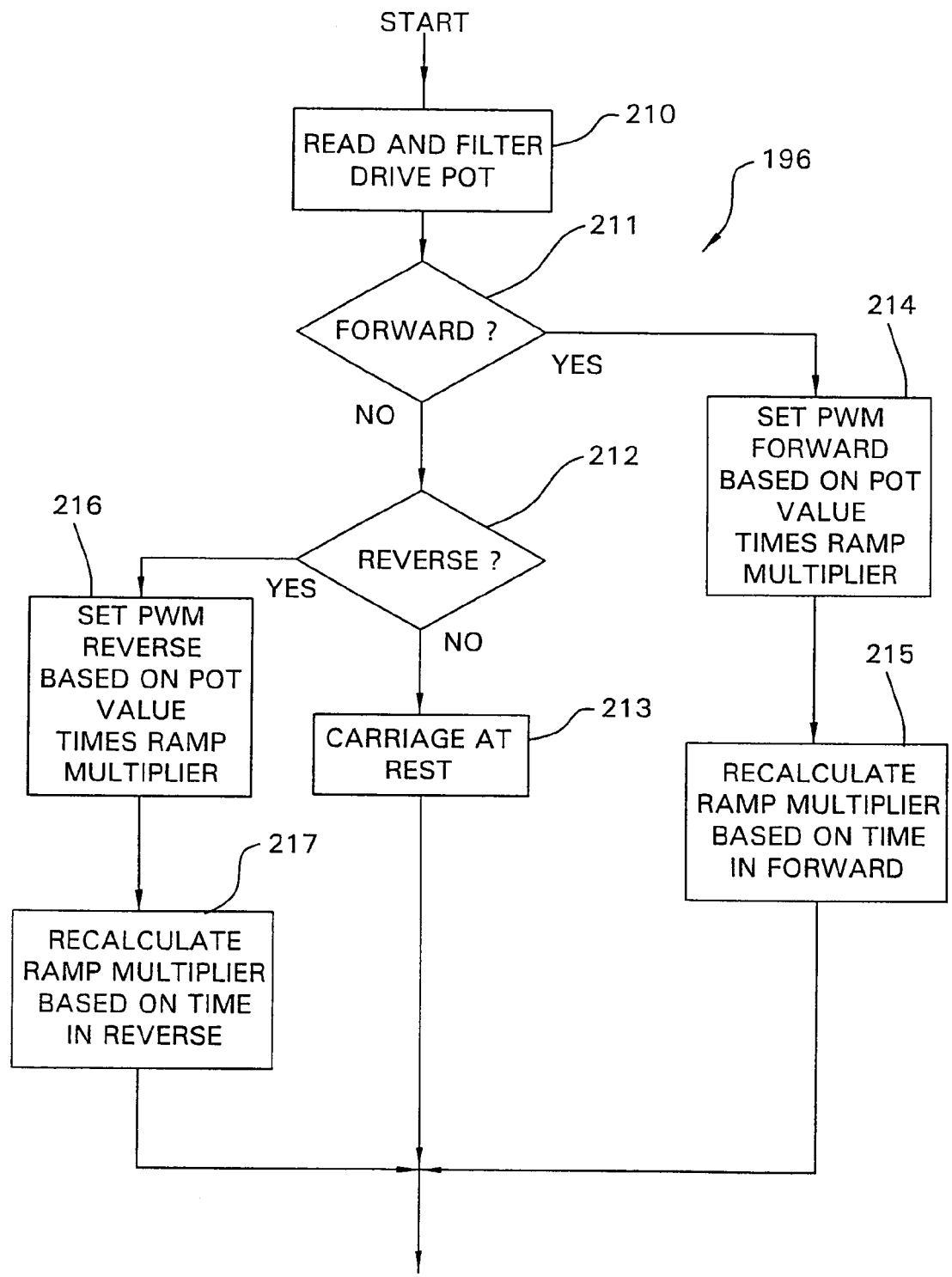
FIG. 16 is a block diagram of an auxiliary wheel drive subroutine.

FIG. 16 illustrates the auxiliary wheel drive subroutine 196. This drive subroutine 196 enables driving of the auxiliary wheel 34 of the wheeled carriage 14 in forward and reverse directions in a controlled manner. The speed of the wheeled carriage 14 depends on the direction and amount of movement of the drive handle 70.

In the first block 210 of the subroutine, the potentiometer 90 is read and filtered. Thus the voltage received by the CPU 166 shown in FIG. 13 can change to a greater or lesser voltage depending on the movement of the drive handle 70 rotating the toothed gear 91 shown in FIG. 9. As set forth earlier, rotation of the toothed gear 91 varies the position of the wiper 97 shown in FIG. 13.

In forward decision block 211, the sensed voltage is input to the CPU 166 through wiper 97. The CPU 166 can include a separate circuit for comparing the sensed voltage to a mid-potentiometer voltage value corresponding to the sensed potentiometer voltage when the drive handle 70 is at rest in the neutral position. The drive subroutine 196 then advances to reverse decision block 212. Therefore, the forward driving mode is not selected and drive motor 44 is not actuated in the forward direction.

Reverse decision block 212 does a similar comparison to decision block 211. If the sensed voltage from potentiometer 90 is greater or approximately the same as the mid-pot or baseline voltage value, then the reverse driving mode is not selected. Thus, the drive motor 44 is not operated and the drive subroutine 196 returns to the main operating program 187.

Figure 17:
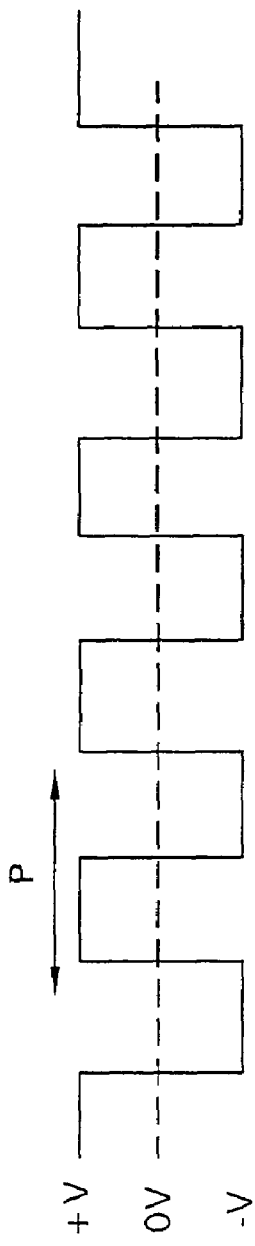
FIG. 17 is a pulse width modulated waveform having a duty cycle of 50%.

In the meantime, even though neither the forward or reverse directions are selected for driving the DC motor 44, an output signal is sent from CPU 166 to motor controller 158 along signal line 169 as shown in FIG. 12. This output signal is a pulse width modulation (PWM) signal as shown in FIG. 17. The pulse width modulation signal in FIG. 17 is represented as pulses having equal lengths of positive and negative voltage. FIG. 17 shows the PWM signal having a positive value for 50% of the time and a negative value for 50% of the time for each time period P. Thus, in operation, the effective voltage applied to the motor controller 158 is zero volts. Therefore, with a duty cycle of 50%, the motor controller 158 does not actuate the drive motor 44 and the auxiliary wheel 34 does not move.

Forward Drive

Returning to the beginning of the auxiliary wheel drive subroutine 196, if the voltage output by potentiometer 90 is greater than the mid-pot voltage value corresponding to neutral, the decision block 211 decides to drive the auxiliary wheel 34 in the forward direction and follows the path corresponding to YES and leading to block 214. At block 214 the PWM signal is set based on the magnitude of the sensed potentiometer voltage minus the mid-pot voltage. The positive voltage value is then multiplied times a forward direction ramp multiplier.

The ramp multiplier is designed to prevent sudden start-up at a high speed when the drive handle 70 is quickly moved a distance corresponding to a fast speed for the wheeled carriage 14. The duty cycle of the overall PWM signal is defined by a preferred forward direction equation as follows.

Duty Cycle=50%+((pot-value−mid-pot value)×(6/ramp multiplier))%; where the ramp multiplier= (17, 15, 11, 9, 7, 6) indexed every ¾ second.

In the above equation:

"duty cycle" represents the positive pulse width of the pulse width modulation signal sent by CPU 166 to the motor controller 158;

50% represents a portion of the duty cycle of the PWM;

"pot-value" equals the voltage value output by the potentiometer;

"mid-pot value" approximately equals the voltage value corresponding to the potentiometer voltage when the drive handle 70 is at rest (neutral condition); and ramp multiplier is an integer which changes based upon the amount of time from beginning movement in the forward direction.

Overall operation of the function of the auxiliary wheel drive subroutine 196 in the forward direction at block 214 is described as follows. The pot-value taken from the potentiometer 90 is reduced by the mid-pot value stored in the CPU 166. The subtracted value is then multiplied by 6 and divided by the ramp multiplier which is preferably indexed every ¾ second. The CPU 166 detects the time when forward operation begins. For the. first forward operation, the ramp multiplier is 17. Therefore, the wheeled carriage is driven at an immediate speed that is 6/17 of the actual speed determined by the position of the drive handle 70. As the duty cycle increases beyond 50%, the positive pulse width applied to the drive motor 44 increases and begins driving the auxiliary wheel 34. Another ramp multiplier is then calculated or retrieved by CPU 166 as shown at block 215. After ¾ of a second passes, the pot-value is again read and the calculated or stored ramp multiplier, which now has a value of 15 is applied to the equation. Therefore, for the second time period of ¾ of a second, the wheeled carriage 14 is driven at a speed that is 6/15 (40%) of the speed selected by the position of the drive handle 70. As each ¾ second interval passes, the pot-value is read and as the value of the ramp multiplier decreases, the value of the fraction (6/ramp value) increases. The final value for the ramp multiplier is 6, in which case the fraction becomes 1. Thus, after a sufficient time passes, the ramp multiplier remains at 6 until the wheeled carriage 14 stops and the ramp multiplier restarts at the same values over time as before. In conclusion, the ramp multiplier only affects the speed of the wheeled carriage 14 during the first few seconds of operation in the forward direction. The ramp multiplier provides nonlinear ramping of the speed of the wheeled carriage 14.

By reducing the speed and acceleration of the wheeled carriage 14 during the first few seconds of operation, the auxiliary wheel drive subroutine 196 provides a smooth ride for a person and avoids jerkiness at start-up.

Figure 18:
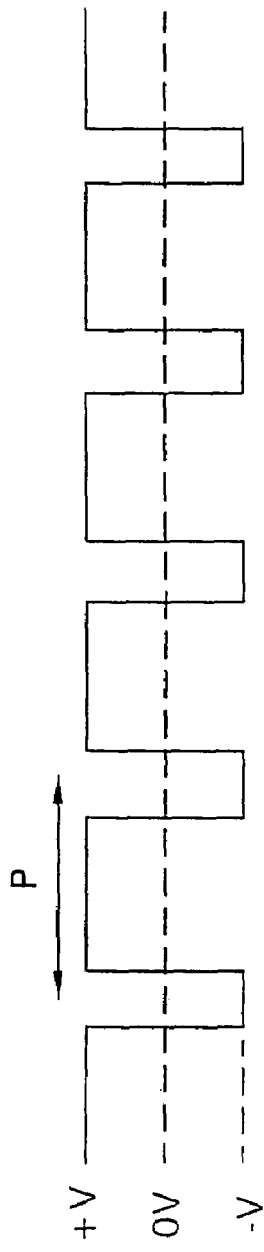
FIG. 18 is a pulse width modulated waveform having a duty cycle of 75%.

FIG. 18 shows a PWM signal for operation of the drive motor 44 in the forward direction having a duty cycle of 75%. This preferably is the greatest duty cycle permitted to drive the motor 44 and drives the auxiliary wheel 34 at a maximum speed. Longer duty cycles may damage the drive motor 44.

Reverse Drive

Returning to the beginning of the auxiliary wheel drive subroutine 196, if the voltage output by potentiometer 90 is less than the mid-pot voltage value corresponding to neutral, the drive handle 70 must be positioned toward an operator which corresponds to a reverse direction. The decision block 211 provides a NO output and the drive subroutine 196 advances to decision block 212. Decision block 212 provides a YES output to indicate driving of the auxiliary wheel 34 in the reverse direction and advances to block 216. At block 216 the PWM signal is set based on the mid-pot voltage minus the sensed potentiometer voltage. The positive voltage value is then multiplied times a reverse direction ramp multiplier.

The reverse direction ramp multiplier is designed to prevent sudden start-up and jerking of the wheeled carriage 14 when the drive handle 70 is quickly moved a distance corresponding to a fast reverse direction speed for the wheeled carriage 14. The function of the auxiliary wheel drive subroutine 196 in the reverse direction is defined by the reverse direction equation as follows.

Duty Cycle=50%−((mid-pot value−pot-value)×(2/ramp multiplier))%; where the ramp multiplier= (6, 5, 4, 3, 2) indexed every ¾ second.

In the above reverse direction equation, the terms are defined the same as in the forward direction equation. This equation is identical to the forward direction equation, except for the value divided by the ramp multiplier is 2, and the ramp multiplier starts at a value of 6 and proceeds to a value of 2 in increments of 1.

Overall operation of the function of the auxiliary wheel drive subroutine 196 in the reverse direction at block 216 is described as follows. The mid-pot value is reduced by the pot-value taken from potentiometer 90. The subtracted value is then multiplied by 2 and divided by the ramp multiplier which is indexed every ¾ second. The CPU 166 detects the time when reverse operation begins. For the first reverse operation, the ramp multiplier is 6. Therefore, the wheeled carriage is driven at an immediate speed that is 2/6 (33%) of the actual speed determined by the position of the drive handle 70. Then another ramp multiplier is retrieved or calculated as shown at block 217. After ¾ of a second passes, the pot-value is again read and the recalculated or stored ramp multiplier, which now has a value of 5 is applied to the reverse direction equation. Therefore, for the second time period of ¾ of a second, the wheeled carriage 14 is driven at a speed that is 2/5 (40%) of the speed selected by the position of the drive handle 70. As each ¾ second interval passes, the pot-value is read and as the value of the ramp multiplier decreases, the value of the fraction (2/ramp value) increases. The final value for the ramp multiplier is 2, in which case the fraction becomes 1. Thus, after a sufficient time passes, the ramp multiplier remains at 2 until the wheeled carriage 14 stops moving. If the wheeled carriage 14 again begins moving in the reverse direction, the ramp multiplier restarts at the same values over time as before. In conclusion, the ramp multiplier only effects the speed of the wheeled carriage 14 during the first few seconds of operation in the reverse direction.

The above equation reduces the speed and acceleration of the wheeled carriage 14 during the first few seconds of operation in the reverse direction in a similar manner to the forward equation for the forward direction.

Most importantly for the reverse drive equation, the value (obtained by subtracting the pot values and multiplying with the ramp multiplier) is subtracted from 50%. Therefore, the duty cycle of the PWM signal will always have a value less than 50%.

Figure 19:
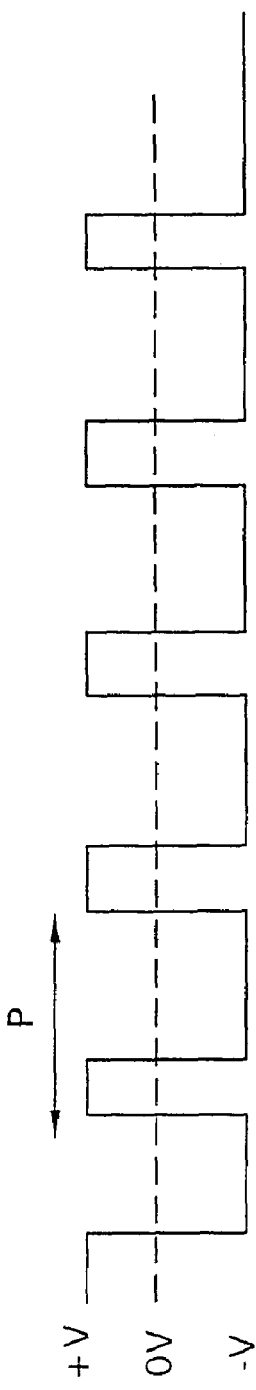
FIG. 19 is a pulse width modulated waveform having a duty cycle of 25%.

For purposes of illustration, FIG. 19 shows a PWM signal having a duty cycle of 25%. For the time period P, the pulse has a positive width for 25% of the time period P. Thus, the width of the pulse is modulated to have a greater negative pulse time and a smaller positive pulse time during each period P. The minimum PWM signal permitted for operating the drive motor 44 is a duty cycle of 15%.

The decrease in duty cycle provides the drive motor 44 with a negative average voltage which drives the auxiliary wheel 34 proportionally to the value of the duty cycle of the PWM signal in a direction (reverse) opposite to the direction when the PWM signal has a duty cycle greater than 50%. As the duty cycle reduces, the speed of the wheeled carriage 14 in the reverse direction increases.

Drive Equation

The values selected for the ramp multipliers in the above equations are merely optimum integer values which can be stored in CPU 166. The ramp multipliers and predetermined value divided thereby can be represented generally by an equation: K/(K+N), where K is a preselected constant value and N is an integer beginning at a value of at least 3 and incrementally decreasing to zero. Please note that N can decrease in value by multiple integers. For example, sequences of values can be (9, 7, 4, 1, 0) or (11, 7, 6, 5, 2, 0). The sequences are selected depending on the ramping effect desired during start-up movement of the wheeled carriage 14 in the forward or reverse direction. Of course the sequence of values for N can be varied for movement in the forward or reverse directions as set forth in the earlier presented examples.

A forward direction equation incorporating the values for K an N is as follows.

$$PWM = 50\% + ((\text{pot-value} - \text{mid-pot value}) \times (K/K+N))\ \%$$

where K is a preselected integer greater than 1 and N represents a preselected integer having a first value of at least 3 that decreases by predetermined increments at each interval of the drive subroutine 196 until reaching the value zero such that no ramp multiplier effect remains.

A reverse direction equation can be formed by substituting the K and N terms in appropriate places in the reverse direction equation set forth earlier or utilizing the above equation where the pot value is less than the mid-pot value and a negative value is generated when the values are subtracted.

The maximum speed in the forward direction for the wheeled carriage 14 preferably is 3 mph and the maximum speed in the reverse direction preferably is 2.5 mph.

In instances where the wheeled carriage 14 is being driven and a safety sensor 63, 64 is released, the DC power is disconnected from drive motor 44 and the carriage comes to a coasting stop.

If the wheeled carriage 14 is driven in the forward direction and the drive handle 70 is quickly moved to the reverse direction, the wheeled carriage quickly stops and then begins reverse operation using the ramping effect discussed above.

Time-out Subroutine

Figure 14:
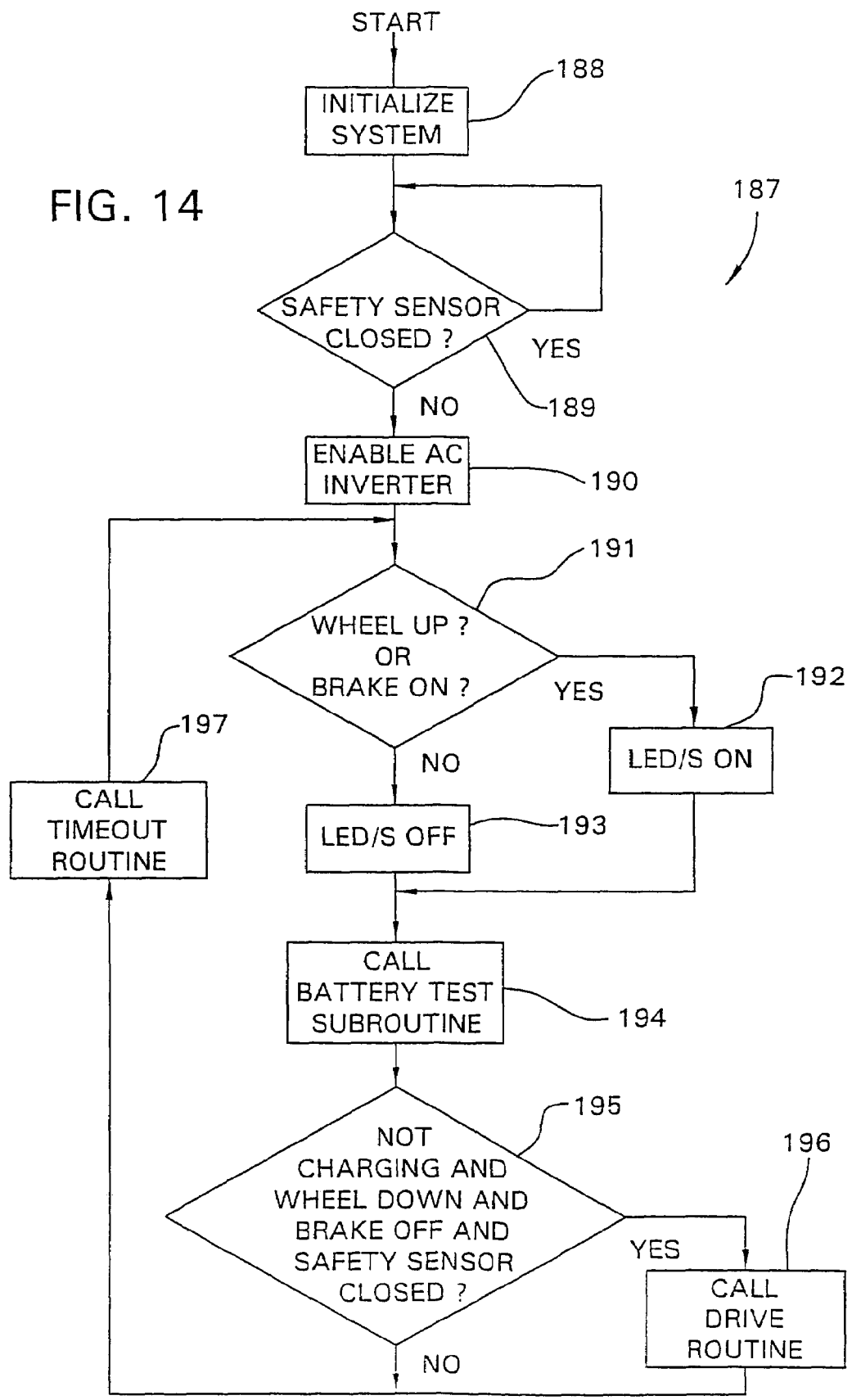
FIG. 14 is a block diagram of a main wheeled carriage drive operating program.

As shown in FIG. 14, when the decision block 195 does not call for auxiliary wheel drive subroutine 196 or when the drive subroutine is completed, the main wheeled carriage drive operating software program 187 advances to timeout subroutine 197.

Figure 20:
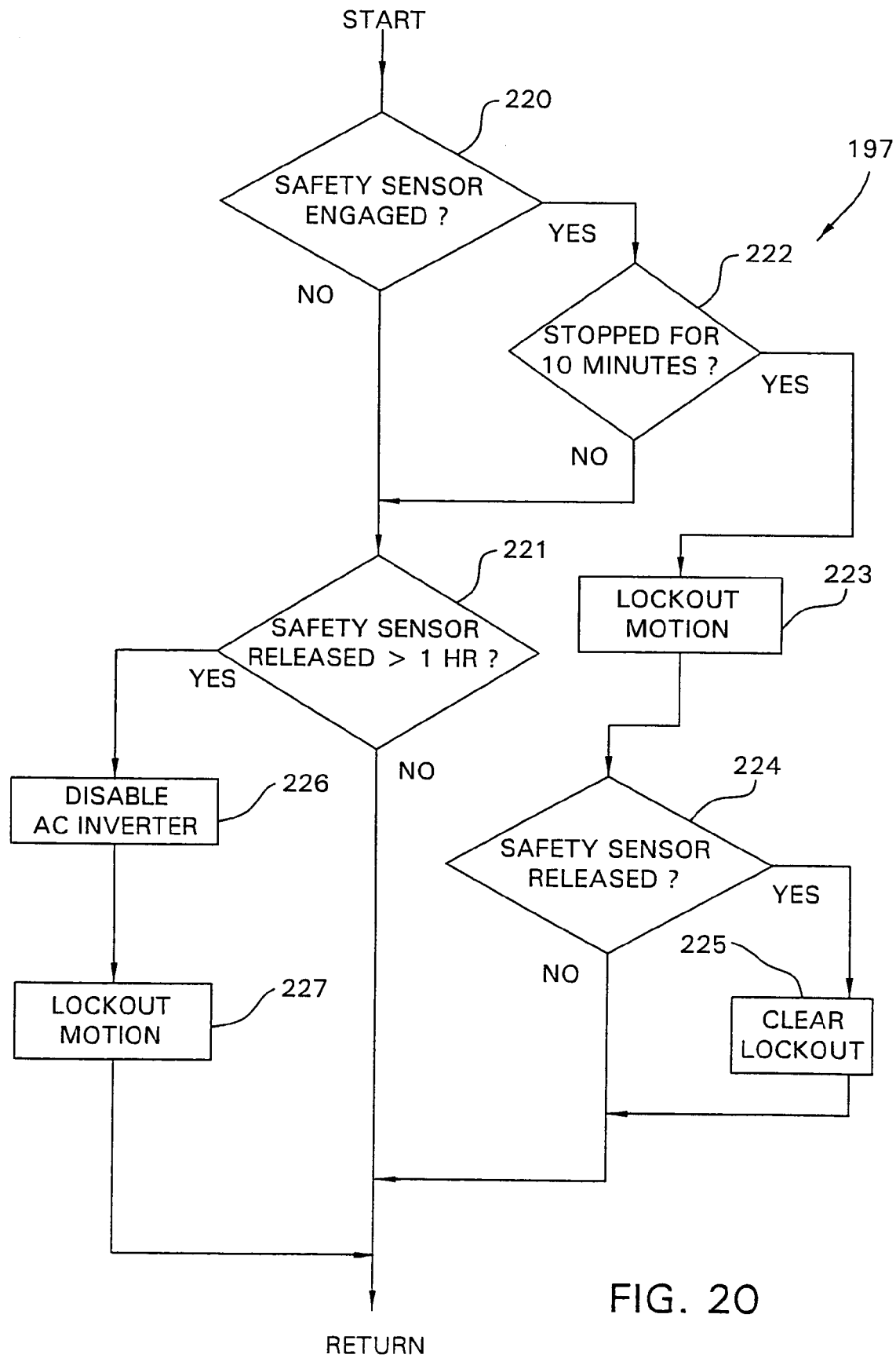
FIG. 20 is a block diagram of a time-out subroutine of the main wheeled carriage drive operating program.

The block diagram of FIG. 20 illustrates the timeout subroutine 197. In the first safety sensor decision block 220 the time-out subroutine 197 decides if either of the motion safety sensors 63, 64 are engaged. If neither motion safety sensor 63, 64 is engaged, the timeout subroutine advances to decision block 221. Decision block 221 determines if the motion safety sensors 63, 64 have been released for a given time period, preferably a time period of greater than one hour. If not, the subroutine returns to the main wheeled carriage drive operating software program 187.

If the safety sensor decision block 220 detects engagement of a motion safety sensor 63, 64, the timeout subroutine advances to decision block 222. At decision block 222, the timeout subroutine determines if the wheeled carriage 14 is stopped for a predetermined time period, such as ten minutes, with a motion safety sensor 63, 64 engaged the entire time. If a safety sensor 63, 64 has not been engaged for the predetermined time, the timeout subroutine 197 goes from decision block 222 to decision block 221 as discussed earlier. However, if a safety sensor 63, 64 is engaged for greater than the predetermined time, the decision block 222 advances to lock out motion block 223.

The lock-out motion block 223 prevents driving of the wheeled carriage 14, even when the conditions for driving have been met. For example, when the brake is released and the auxiliary wheel 34 is lowered.

The timeout subroutine 197 then advances to decision block 224. As long as the safety sensors 63, 64 are not both released, the timeout subroutine 197 returns to the main drive operating software program 187 and the drive motor 44 remains locked out from operating.

The timeout subroutine 197 will not enable motion of the wheeled carriage 14 until the motion safety sensors 63, 64 are both released. This important safety feature prevents personnel from biasing one of the motion safety sensors 63, 64 in a closed condition to enable movement of the wheeled carriage 14 without squeezing or grasping at least one of the safety sensors on the drive handle 70.

When the motion safety sensors 63, 64 are both released, the decision block 224 clears out the lock-out condition as shown at block 225 and then allows the potentiometer 90 to drive the drive motor 44 through the decision/drive circuit 182. Therefore, operation of the wheeled carriage 14 returns to a standard condition ready for operation.

In the instance that neither of the motion safety sensors 63, 64 are engaged, and have not been engaged for greater than 1 hour as set forth in the decision block 221, the timeout subroutine 197 advances to block 226.

Block 226 disables the AC invertor 156. This saves power for the batteries 160, 162 and reduces the frequency of recharging. The main wheeled carriage drive operating software program 187 continues to run and scan the condition of the safety sensors 63, 64.

The timeout subroutine 197 then advances to lockout motion block 227. Lockout motion block 227 locks out driving of the auxiliary wheel 34 as described earlier, to prevent power loss. Then the timeout subroutine 197 returns to the main wheeled carriage drive operating software program 187.

When a motion safety sensor 63, 64 again eventually engages, the AC invertor 156 can be enabled, and the wheeled carriage 14 can operate in a normal manner with power supplied to the auxiliary wheel drive power circuit 150.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A method for driving a wheeled carriage used for supporting and transporting a person in a substantially horizontal position, the carriage including a patient support having a length, opposing ends of the length comprising a head end and a foot end of said patient support, a wheeled base having a length and supporting said patient support and enabling movement of said patient support, an auxiliary wheel mechanism secured to said wheeled base and for positioning at least one auxiliary wheel into a first position contacting a floor below the wheeled carriage and into a second raised position out of engagement with the floor, a drive motor assembly including a drive motor for driving said auxiliary wheel, the method comprising the steps of, when said carriage is in a rest position and the auxiliary wheel contacts the floor:

(a) sensing a drive signal input by an operator for driving said at least one auxiliary wheel in a first direction;

(b) calculating a power signal based on the drive signal and a time value measured during a predetermined time period following start of the drive signal;

(c) applying the power signal to the drive motor to drive the auxiliary wheel; and (d) repeating steps (a)–(d) until the time value measured equals the predetermined time period, the step of calculating the power signal then being based only on the drive signal.

2. The method for driving a wheeled carriage of claim 1, wherein as the measured time value increases, the power signal based on the drive signal increases, even when a drive value of the drive signal remains constant, to provide a ramping effect for the velocity of the carriage during the predetermined time period.

3. The method for driving a wheeled carriage of claim 1, wherein the step of calculating a power signal comprises multiplying the drive signal by a ramp multiplier, the ramp multiplier increasing as a function of the measured time value during the predetermined time period after start of the drive signal to provide a ramping effect on the velocity of the carriage during the predetermined time period.

4. The method for driving a wheeled carriage of claim 3, wherein the ramp multiplier becomes a constant value when the time value equals the predetermined time period.

5. The method for driving a power assisted wheeled carriage of claim 1, wherein the drive motor comprises a DC electric motor, and the step of applying the power signal comprises providing pulse width modulation signals to the DC electric motor.

6. The method for driving a power assisted wheeled carriage of claim 1, wherein the drive signal has a first range of values for driving the auxiliary wheel in a first direction and a second range of values for driving the auxiliary wheel in a second opposing direction.

7. A method for driving a power assisted wheeled carriage used for supporting and transporting a person in a substantially horizontal position, the carriage including a patient support having a length, opposing ends of the length comprising a head end and a foot end of said patient support, a wheeled base having a length and supporting said patient support and enabling movement of said patient support, castered wheels mounted at each opposing corner at each opposing end of said wheeled base, an auxiliary wheel mechanism secured to said wheeled base and for positioning at least one auxiliary wheel into a first position contacting a floor below the wheeled carriage and into a second raised position out of engagement with the floor, a drive motor assembly including a drive motor for driving said auxiliary wheel in one of a first direction and a second opposing direction, said auxiliary wheel being located at a position toward a central section inwardly with respect to said castered wheels of said carriage, and a battery for supplying power to said drive motor, the method comprising the steps of, when said carriage is in a rest position:

sensing that a power cable is not connected to an external AC power supply;

sensing that a brake of the wheeled carriage is in a released position;

sensing that the charge of the battery exceeds a minimum charge value;

sensing that the auxiliary wheel is in engagement with the floor;

the method further comprising when 1) the power cable is not connected to the external AC power supply, 2) the brake is in the released position, 3) the charge of the battery exceeds the minimum charge value, and 4) the auxiliary wheel is in engagement with the floor, the steps of:

(a) sensing a drive signal for driving said at least one auxiliary wheel in a first direction;

(b) calculating a power signal based on the drive signal;

(c) applying the power signal to the drive motor to drive the auxiliary wheel; and (d) repeating steps (a)–(d), until the drive signal is no longer sensed.

8. The method for driving a power assisted wheeled carriage of claim 7, wherein the step of calculating a power signal comprises calculating the power signal based on the drive signal and a time value since start of the drive signal so that the step of calculating the power signal is not based only on the drive signal until after the time value equals a predetermined time period.

9. The method for driving a power assisted wheeled carriage of claim 8, wherein as the time value increases, the power signal based on the drive signal increases even while a drive value of the drive signal remains constant to provide a ramping effect for the velocity of the carriage during the predetermined time period.

10. The method for driving a power assisted wheeled carriage of claim 8, wherein the step of calculating a power signal comprises multiplying the power signal based on the drive signal by a ramp multiplier, the ramp multiplier increasing as the time value increases after start of the drive signal to provide a ramping effect on the velocity of the carriage during the predetermined time period.

11. The method for driving a power assisted wheeled carriage of claim 10, wherein the ramp multiplier becomes a constant value when the time value equals the predetermined time period.

12. The method for driving a power assisted wheeled carriage of claim 7, wherein the drive motor comprises a DC electric motor, and the step of applying the power signal comprises providing pulse width modulation signals to the DC electric motor.

13. The method for driving a power assisted wheeled carriage of claim 7, wherein the drive signal has a first range of values for driving the auxiliary wheel in the first direction and a second range of values for driving the auxiliary wheel in the second opposing direction.

14. A method for driving a power assisted wheeled carriage used for supporting and transporting a person in a substantially horizontal position, the carriage including a patient support having a length, opposing ends of the length comprising a head end and a foot end of said patient support, a wheeled base having a length and supporting said patient support and enabling movement of said patient support, castered wheels mounted at each opposing corner at each opposing end of said wheeled base, an auxiliary wheel mechanism secured to said wheeled base and for positioning at least one auxiliary wheel into a first position contacting a floor below the wheeled carriage and into a second raised position out of engagement with the floor, a drive motor assembly including a drive motor for driving said auxiliary wheel in one of a first direction and a second opposing direction, said auxiliary wheel being located at a position toward a central section inwardly with respect to said castered wheels of said carriage, and a battery for supplying power to said drive motor, the method comprising the steps of, when said carriage is in a rest position and an on/off switch enables driving of said auxiliary wheel:

sensing that a brake of the wheeled carriage is in a released position;

sensing that the auxiliary wheel is in engagement with the floor;

the method further comprising when 1) the brake is in the released position, and 2) the auxiliary wheel is in engagement with the floor, the step of sensing a drive signal from a drive member controlled by an operator for driving said at least one auxiliary wheel and providing a power signal to said drive member to drive said auxiliary wheel in one of the first direction and the second opposing direction.

15. The method for driving a power assisted wheeled carriage of claim 14, wherein an operator controls the drive member so that the drive signal has a first range of values for driving the auxiliary wheel in the first direction and a second range of values for driving the auxiliary wheel in the second opposing direction.

16. The method for driving a power assisted wheeled carriage of claim 14, including the step of sensing that a power cable is not connected to an external AC power supply to enable the step of sensing a drive signal to drive said auxiliary wheel.

17. The method for driving a power assisted wheeled carriage of claim 14, including the step of sensing that the charge of the battery exceeds a minimum charge value to enable the step of sensing a drive signal to drive said auxiliary wheel.

* * * * *